(12) United States Patent
Zhang et al.

(10) Patent No.: US 12,099,691 B2
(45) Date of Patent: Sep. 24, 2024

(54) METHOD AND APPARATUS, COMPUTER DEVICE, AND STORAGE MEDIUM FOR PICKING UP A VIRTUAL ITEM IN A VIRTUAL ENVIRONMENT

(71) Applicant: TENCENT TECHNOLOGY (SHENZHEN) COMPANY LIMITED, Shenzhen (CN)

(72) Inventors: Ya Zhang, Shenzhen (CN); Xiyang Zhou, Shenzhen (CN); Yiqi Li, Shenzhen (CN); Han Wen, Shenzhen (CN); Ronghao Huang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 161 days.

(21) Appl. No.: 17/006,358

(22) Filed: Aug. 28, 2020

(65) Prior Publication Data

US 2020/0393953 A1 Dec. 17, 2020

Related U.S. Application Data

(63) Continuation of application No. PCT/CN2019/094208, filed on Jul. 1, 2019.

(30) Foreign Application Priority Data

Aug. 31, 2018 (CN) .......................... 201811014962.7

(51) Int. Cl.
*G06F 3/00* (2006.01)
*G06F 3/04815* (2022.01)
(Continued)

(52) U.S. Cl.
CPC ...... *G06F 3/04815* (2013.01); *G06F 3/04817* (2013.01); *G06F 3/04842* (2013.01);
(Continued)

(58) Field of Classification Search
CPC ............. G06F 3/04815; G06F 3/04817; G06F 3/04842; G06F 3/04847; G06F 3/0488;
(Continued)

(56) References Cited

U.S. PATENT DOCUMENTS

| 5,810,666 A | * | 9/1998 | Mero | ...................... A63F 3/081 463/41 |
| 2004/0046800 A1 | * | 3/2004 | Emerson | ................. A63F 13/47 715/810 |

(Continued)

FOREIGN PATENT DOCUMENTS

| CN | 106527887 A | 3/2017 |
| CN | 107837531 A | 3/2018 |

(Continued)

OTHER PUBLICATIONS

Chinese Office Action issued Jan. 25, 2021 in Application No. 201811014962.7, therein with concise English translation. (20 pages).

(Continued)

*Primary Examiner* — Kieu D Vu
*Assistant Examiner* — Anita D Chaudhuri
(74) *Attorney, Agent, or Firm* — ArentFox Schiff LLP

(57) ABSTRACT

This application discloses a method and an apparatus for picking up a virtual item in a virtual environment, a terminal, and a computer-readable storage medium, which belong to the field of human-computer interaction. The method can include displaying a user interface, and obtaining, according to a first instruction triggered by an interaction operation on the user interface, an operation trajectory formed by the interaction operation on the user interface. The method can further include obtaining, in a case that the operation trajectory forms an enclosed region, at least two target virtual items located in the enclosed region in the virtual environment, aggregating the target virtual items in a designated (Continued)

location in the virtual environment, and controlling, in a case that the virtual object moves to the designated location, the virtual object to pick up the target virtual items.

19 Claims, 12 Drawing Sheets

(51) Int. Cl.
    *G06F 3/04817*     (2022.01)
    *G06F 3/04842*     (2022.01)
    *G06F 3/04847*     (2022.01)
    *G06F 3/0488*     (2022.01)
    *G06F 9/00*     (2018.01)
    *G06F 17/00*     (2019.01)
    *G06V 20/20*     (2022.01)

(52) U.S. Cl.
    CPC ........ *G06F 3/04847* (2013.01); *G06F 3/0488* (2013.01); *G06V 20/20* (2022.01)

(58) Field of Classification Search
    CPC . G06F 3/04883; G06K 9/00671; A63F 13/42; A63F 13/56; A63F 13/837; A63F 2300/6045; A63F 2300/8076
    See application file for complete search history.

(56) References Cited

U.S. PATENT DOCUMENTS

| | | | |
|---|---|---|---|
| 2005/0253840 A1* | 11/2005 | Kwon | G06Q 30/0603 345/419 |
| 2007/0200855 A1* | 8/2007 | Minagawa | A63F 13/577 345/474 |
| 2007/0265047 A1* | 11/2007 | Nomura | A63F 13/00 463/8 |
| 2012/0329556 A1* | 12/2012 | Eddy | A63F 13/63 463/30 |
| 2013/0080950 A1* | 3/2013 | Alford, Jr. | G06F 3/04817 715/765 |
| 2013/0120282 A1* | 5/2013 | Kukulski | G06F 3/04883 345/173 |
| 2013/0210556 A1* | 8/2013 | Vilar | A63B 47/025 473/431 |
| 2013/0238724 A1* | 9/2013 | Cunningham | G06F 3/04842 709/206 |
| 2014/0129937 A1* | 5/2014 | Jarvinen | G08C 17/02 715/716 |
| 2015/0157932 A1* | 6/2015 | Kwon | G06Q 50/00 463/31 |
| 2015/0355814 A1* | 12/2015 | Miyamoto | G06F 3/0304 345/173 |
| 2016/0001184 A1 | 1/2016 | Sepulveda et al. | |
| 2016/0179198 A1* | 6/2016 | Levesque | G06F 1/163 340/407.1 |
| 2017/0266565 A1* | 9/2017 | Choudhuri | A63F 13/44 |

FOREIGN PATENT DOCUMENTS

| | | |
|---|---|---|
| CN | 108159696 A | 6/2018 |
| CN | 108459811 A | 8/2018 |

OTHER PUBLICATIONS

Spider Player, "How to set up DNF to pick up items with one click," <https://jingyan.baidu.com/article/425e69e60ae574be14fc167e.html>, May 16, 2018 (2 pages).

Old Yu's Stories, "How do I return back to my set destination from an irregular range with gestures on Baidu's Map?" <https://www.zhihu.com/question/45857672>, May 9, 2016 (2 pages).

One person's reunion, "How to set up items to be picked up in the PC version of Wilderness Action," <https://jingyan.baidu.com/article/f3ad7d0f2b404109c3345b0a.html>, Jan. 22, 2018 (3 pages).

International Search Report issued Sep. 29, 2019 in International Application No. PCT/CN2019/094208, (6 pages) (with English translation).

Written Opinion issued Sep. 29, 2019 in International Application No. PCT/CN2019/094208. (4 pages).

* cited by examiner

METHOD AND APPARATUS, COMPUTER DEVICE, AND STORAGE MEDIUM FOR PICKING UP A VIRTUAL ITEM IN A VIRTUAL ENVIRONMENT

RELATED APPLICATION

This application is a continuation of International Application No. PCT/CN2019/094208, filed on Jul. 1, 2019, which claims priority to Chinese Patent Application No. 201811014962.7, entitled "METHOD AND APPARATUS FOR PICKING UP VIRTUAL ITEM IN VIRTUAL ENVIRONMENT, AND TERMINAL" and filed on Aug. 31, 2018. The entire disclosures of the prior applications are hereby incorporated by reference in their entirety.

FIELD OF THE TECHNOLOGY

This application relates to the field of human-computer interaction, including to a method and an apparatus for picking up a virtual item in a virtual environment, a terminal, and a computer-readable storage medium.

BACKGROUND OF THE DISCLOSURE

Terminals, such as a smartphone, a tablet computer, and a desktop computer, are provided with many applications based on a virtual environment, for example, a virtual reality application, a three-dimensional map application, a military simulation application, a third-person shooting (TPS) game, a first-person shooting (FPS) game, and a multiplayer online battle arena (MOBA) game. In the foregoing applications, a virtual object, for example a virtual character, may obtain virtual items in the virtual environment through actions, such as pickup and purchase.

Generally, in a virtual environment, a user controls a virtual object to move to a location of a virtual item, and may pick up the virtual item in an automatic pickup or active pickup manner. When the virtual environment includes a plurality of virtual items at different locations, the user needs to control the virtual object to move near to the location of each virtual item to pick up the virtual item. For example, a virtual item 1, a virtual item 2, and a virtual item 3 are displayed in the virtual environment displayed in a display interface. The user needs to control the virtual object to move near to a location of the virtual item 1. After picking up the virtual item 1, control the virtual object to move near to a location of the virtual item 2. After picking up the virtual item 2, control the virtual object to move near to a location of the virtual item 3, to pick up the virtual item 3, thus completing pickup of the virtual item 1, the virtual item 2, and the virtual item 3.

Because in the related art, the virtual object needs to be controlled to move near to the location of each virtual item, to pick up the virtual item, the user needs to perform a plurality of operations, resulting in relatively low efficiency of human-computer interaction.

SUMMARY

A method and an apparatus for picking up a virtual item in a virtual environment, a terminal, and a computer-readable storage medium are provided according to various embodiments of this application.

A method for picking up a virtual item in a virtual environment can be performed by a terminal. The method can include displaying a user interface, the user interface displaying a virtual environment and a virtual object located in the virtual environment, and obtaining, according to a first instruction triggered by an interaction operation on the user interface, an operation trajectory formed by the interaction operation on the user interface. The method can further include obtaining, in a case that the operation trajectory forms an enclosed region, at least two target virtual items located in the enclosed region in the virtual environment, aggregating the target virtual items in a designated location in the virtual environment, and controlling, in a case that the virtual object moves to the designated location, the virtual object to pick up the target virtual items.

An apparatus for picking up a virtual item in a virtual environment can include processing circuitry that is configure to display a user interface, the user interface displaying a virtual environment and a virtual object located in the virtual environment, and obtain, according to a first instruction triggered by an interaction operation on the user interface, an operation trajectory formed by the interaction operation on the user interface, and obtain, in a case that the operation trajectory forms an enclosed region, at least two target virtual items located in the enclosed region in the virtual environment. The processing circuitry can further aggregate the target virtual items in a designated location in the virtual environment, and control, in a case that the virtual object moves to the designated location, the virtual object to pick up the target virtual items.

A terminal includes a processor and a memory, the memory storing at least one instruction, the instruction being loaded and executed by the processor to implement the method for picking up a virtual item in a virtual environment.

A computer-readable storage medium stores at least one instruction, the instruction being loaded and executed by a processor to implement the method for picking up a virtual item in a virtual environment.

Details of one or more embodiments of this application are provided in the accompany drawings and description below. Other features, objectives, and advantages of this application will become apparent from the specification, the accompanying drawings, and the claims.

BRIEF DESCRIPTION OF THE DRAWINGS

Various exemplary embodiments of this disclosure that are proposed as examples will be described in detail with reference to the following figures, wherein like numerals reference like elements, and wherein.

DESCRIPTION OF EMBODIMENTS

Figure 1:
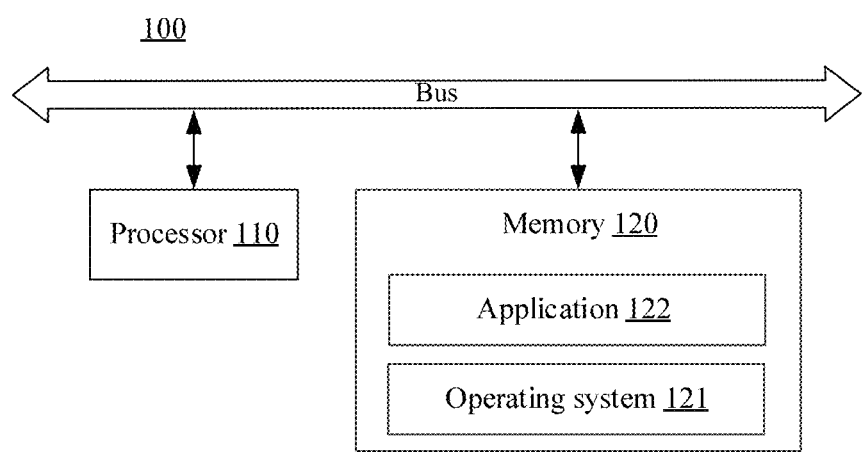
FIG. 1 is a structural block diagram of a terminal according to an exemplary embodiment of this application.

To make objectives, technical solutions, and advantages of this application clearer and more comprehensible, the following further describes this application in detail with reference to the accompanying drawings and embodiments. It is to be understood that the specific exemplary embodiments described herein are merely used for explaining this application and are not intended to limit this application.

First, several terms described in the embodiments of this application are briefly introduced.

Virtual environment: a virtual environment displayed (or provided) by an application when run on a terminal. The virtual environment may be a simulated environment of a real world, or may be a semi-simulated semi-fictional three-dimensional environment, or may be an entirely fictional three-dimensional environment. The virtual environment may be any one of a two-dimensional virtual environment, a 2.5-dimensional virtual environment, and a three-dimensional virtual environment. Optionally, the virtual environment is further used for a virtual environment battle between at least two virtual roles. Optionally, the virtual environment is further used for a battle between at least two virtual roles by using virtual guns. Optionally, the virtual environment is further used for a battle between at least two virtual roles by using virtual guns in a range of a target region, and the range of the target region may be continuously decreased as time goes by in the virtual environment. Description is made by using an example in which the virtual environment is a three-dimensional virtual environment in the following embodiments, but this is not limited.

Virtual object: a movable object in a virtual environment. The movable object may be at least one of a virtual character, a virtual animal, and a cartoon character. Optionally, when the virtual environment is a three-dimensional virtual environment, the virtual object is a three-dimensional model created based on a skeletal animation technology. Each virtual object has a shape and a volume in the three-dimensional virtual environment, and occupies some space in the three-dimensional virtual environment.

Virtual item: an item that a virtual object is equipped with or carries. For example, the virtual item may be a bag that the virtual object is equipped with, or may be a weapon that the virtual object is equipped with, or may be a drug carried by the virtual object. Optionally, an application interface of a virtual environment has an equipment site and a bag lattice. When storing a virtual item into the equipment site, a user is equipped with the virtual item. When the equipment site of the virtual object stores a bag, a bag lattice is obtained. Any virtual item with which the user cannot equip the virtual object may be stored in the bag lattice, for example, a drug, a bandage, or an excess weapon that cannot be equipped with. When a virtual item is stored in the bag lattice, the virtual object carries the virtual item.

Item type: an attribute of a virtual item, where the attribute corresponds to a type of the virtual item. For example, an item type corresponding to a virtual gun is weapon, and a type corresponding to the virtual gun is supply.

Item quantity: a quantity corresponding to a virtual item. For example, a virtual object is equipped with one handgun, a virtual handgun is loaded with 12 handgun bullets, and at the same time, the virtual object further carries 100 handgun bullets. In this case, an item quantity corresponding to the handgun is 1, and an item quantity corresponding to the handgun bullet is 112.

Restoring item: a virtual item that can restore a health point of a virtual object. The health point is an attribute of the virtual object. When the health point of the virtual object is 0, the virtual object is disabled in the virtual environment and cannot continue to perform interaction. For example, an upper limit of the health point of the virtual object is 100. After the virtual object is injured because the virtual object experiences a fight or falls from a high place or due to other reasons, the health point of the virtual object decreases to 60. If the virtual object picks up and uses a restoring item with a restoring value of 30, the health point of the virtual object is restored to 90. Generally, the health point of the virtual object restored by using the restoring item cannot exceed the upper limit of the health point of the virtual object.

Upgrading item: a virtual item that can increase an experience point of a virtual object, where a level of the virtual object may be improved by increasing the experience point. The experience point and the level are attributes of the virtual object. Each level corresponds to an experience point. When the experience point of the virtual object exceeds an upper limit of an experience point of a current level, the level of the virtual object is improved. For example, a current level of the virtual object is level 1, an upper limit of an experience point corresponding to level 1 is 30, and a current experience point of the virtual object is 20. When the virtual object picks up and uses an upgrading item with an experience point of 35, the experience point of the virtual object is increased to 55. Because the upper limit of the experience point corresponding to level 1 is 30, the level of the virtual object is improved to level 2.

A terminal in the embodiments of this application may be a desktop computer, a portable laptop computer, a mobile phone, a tablet computer, an ebook reader, a moving picture experts group audio layer III (MP3) player, a moving picture experts group audio layer IV (MP4) player, or the like. An application supporting a virtual environment is installed and run on the terminal, such as an application supporting a three-dimensional virtual environment. The application may be any one of a virtual reality application, a three-dimensional map application, a military simulation application, a TPS game, an FPS game, and a MOBA game. Optionally, the application may be a standalone application, such as a standalone 3D game application, or may be a network online application.

FIG. 1 is a structural block diagram of a terminal according to an exemplary embodiment of this application. A terminal 100 can include a processor 110 and a memory 120. The processor 110 and the memory 120 implement communication by using a bus, or in another manner. The memory 120 stores an operating system 121 and an application 122.

The operating system 121 is basic software to allow the application 122 to access computer hardware securely.

The application 122 is an application supporting a virtual environment. Optionally, the application 122 is an application supporting a three-dimensional virtual environment. The application 122 may be any one of a virtual reality application, a three-dimensional application, a military simulation application, a TPS game, an FPS game, a MOBA game, and a multiplayer shooting survival game. The application 122 may be a standalone application, such as a standalone 3D game application.

Figure 2:
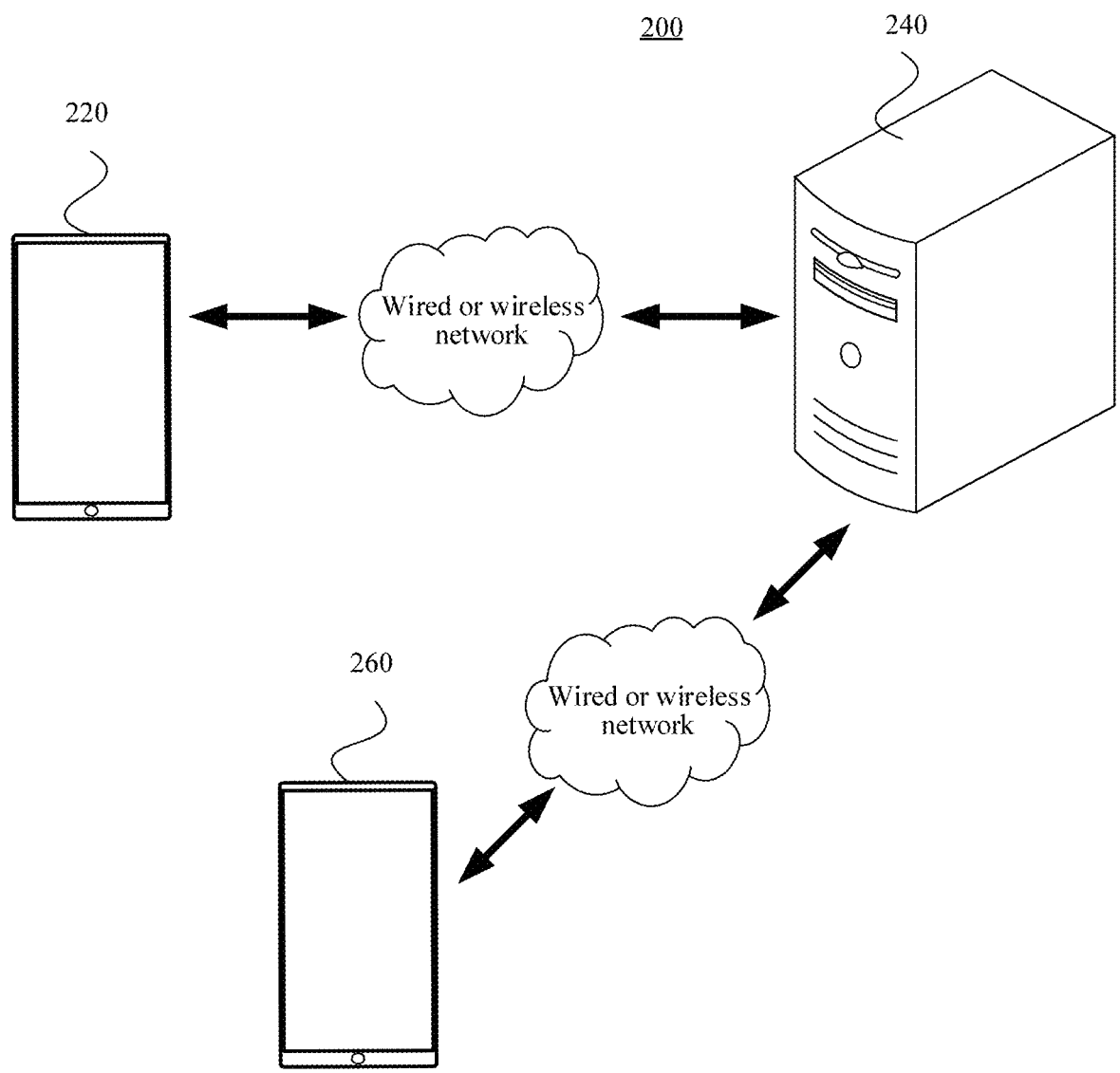
FIG. 2 is a structural block diagram of a computer system according to an exemplary embodiment of this application.

FIG. 2 is a structural block diagram of a computer system according to an exemplary embodiment of this application. A computer system 200 can include a first terminal 220, a server 240, and a second terminal 260.

An application supporting a virtual environment is installed and run on the first terminal 220. The application may be any one of a virtual reality application, a three-dimensional map application, a military simulation application, a TPS game, an FPS game, a MOBA game, and a multiplayer shooting survival game. The first terminal 220 is a terminal used by a first user, the first user uses the first terminal 220 to control a first virtual object in the virtual environment to perform a movement, and the movement includes, but is not limited to, at least one of body posture adjustment, crawling, walking, running, cycling, jumping, driving, picking, shooting, attacking, and throwing. For example, the first virtual object is a first virtual character, such as a simulated character role or a cartoon character role.

The first terminal 220 is connected to the server 240 by using a wireless network or a wired network. The server 240 includes at least one of one server, a plurality of servers, a cloud computing platform, and a virtualization center. The server 240 is configured to provide background services for the application supporting a three-dimensional virtual environment. Optionally, the server 240 takes on primary computing work, and the first terminal 220 and the second terminal 260 take on secondary computing work; alternatively, the server 240 takes on the secondary computing work, and the first terminal 220 and the second terminal 260 take on the primary computing work; alternatively, collaborative computing is performed by using a distributed computing architecture among the server 240, the first terminal 220, and the second terminal 260.

An application supporting a virtual environment is installed and run on the second terminal 260. The application may be any one of a virtual reality application, a three-dimensional map application, a military simulation application, an FPS game, a MOBA game, and a multiplayer shooting survival game. The second terminal 260 is a terminal used by a second user, the second user uses the second terminal 260 to control a second virtual object in the virtual environment to perform a movement, and the movement includes, but is not limited to, at least one of body posture adjustment, crawling, walking, running, cycling, jumping, driving, picking, shooting, attacking, and throwing. For example, the second virtual object is a second virtual character, such as a simulated character role or a cartoon character role.

Optionally, the first virtual character and the second virtual character are located in the same virtual environment. Optionally, the first virtual character and the second virtual character may belong to the same team or the same organization, have a friend relationship, or have a temporary communication permission. Optionally, the first virtual character and the second virtual character may alternatively belong to different teams, different organizations, or two groups hostile to each other.

The applications installed on the first terminal 220 and the second terminal 260 are the same, or the applications installed on the two terminals are the same type of applications of different control system platforms. The first terminal 220 may generally refer to one of a plurality of terminals, the second terminal 260 may generally refer to one of a plurality of terminals, and in this embodiment, and description is made by using only the first terminal 220 and the second terminal 260 as an example. Device types of the first terminal 220 and the second terminal 260 are the same or different. The device type includes at least one of a game console, a desktop computer, a smartphone, a tablet computer, an ebook reader, an MP3 player, an MP4 player, and a portable laptop computer. In the following embodiments, description is made by using an example in which the terminal is a desktop computer.

A person skilled in the art may know that there may be more or fewer terminals. For example, there may be only one terminal, or there may be dozens of or hundreds of terminals, or there may be more terminals. The quantity and the device types of the terminals are not limited in the embodiments of this application.

Figure 3:
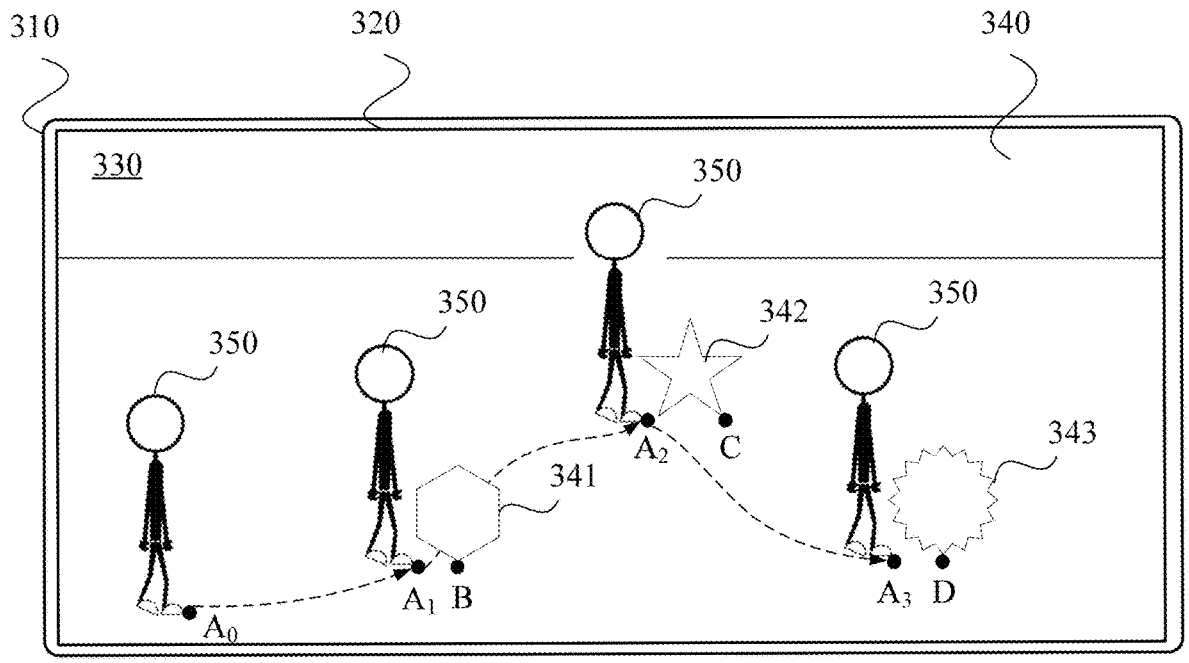
FIG. 3 is a schematic diagram of a user interface in a method for picking up a virtual item in a virtual environment provided in the related art.

FIG. 3 is a schematic diagram of a method for picking up a virtual item in a virtual environment in the related art. As shown in FIG. 3, a display screen 320 of a terminal 310 displays a user interface 330, the user interface 330 displays a virtual environment 340, and the virtual environment 340 includes a virtual object 350, a first virtual item 341, a second virtual item 342, and a third virtual item 343. The method for picking up a virtual item in a virtual environment provided in the related art can include controlling the virtual object 350 to move from an initial location A0 to a first location A1 near a location B of the first virtual item 341 to pick up the first virtual item 341. The method can further include controlling the virtual object 350 to move from the first location A1 to a second location A2 near a location C of the second virtual item 342 to pick up the second virtual item 342, and then controlling the virtual object 350 to move from the second location A2 to a third location A3 near a location D of the third virtual item 343 to pick up the third virtual item 343, so that pickup of the first virtual item 341, the second virtual item 342, and the third virtual item 343 is completed.

Description is made by using an example in which an application corresponding to the virtual environment is a two-dimensional multiplayer battle game. The virtual object 350 in FIG. 3 is a virtual character controlled by the terminal 310, the first virtual item 341 may be a restoring item, the second virtual item 342 may be an upgrading item, and the third virtual item 343 may be a weapon. The terminal 310 controls the virtual character 350 to move to a location of the restoring item 341, and increases a health point of the virtual character 350 according to a restoring value corresponding to the restoring item 341. The terminal 310 controls the virtual character 350 to move to a location of the upgrading item 342, and increases an experience point of the virtual character 350 according to an experience point corresponding to the upgrading item 342. The terminal 310 controls the virtual character 350 to move to a location of the weapon 343, to pick up the weapon 343 and equip the virtual character 350 with the weapon 343.

It can be easily seen that in the related art, the virtual object needs to be controlled to move near to a location of each virtual item, to pick up the virtual item. Therefore, the user needs to perform a plurality of operations, resulting in relatively low efficiency of human-computer interaction.

Figure 4:
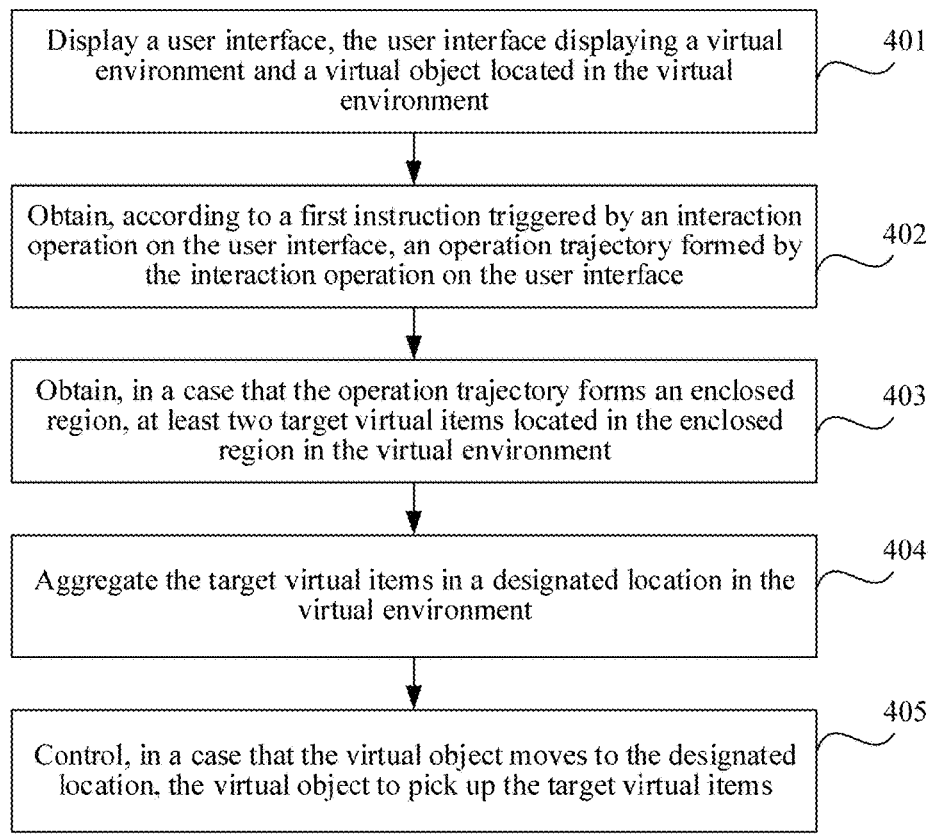
FIG. 4 is a flowchart of a method for picking up a virtual item in a virtual environment according to an exemplary embodiment of this application.

FIG. 4 is a flowchart of a method for picking up a virtual item in a virtual environment according to an exemplary embodiment of this application. As shown in FIG. 4, the method is performed by using the first terminal 220 or the second terminal 260 in the embodiment of FIG. 2. The method includes the following steps In step 401 a user interface can be displayed, the user interface displaying a virtual environment and a virtual object located in the virtual environment. When an application supporting a virtual environment is run on a terminal, a display screen of the terminal displays a user interface of the application, the user interface displaying a virtual environment and a virtual object located in the virtual environment.

Figure 5:
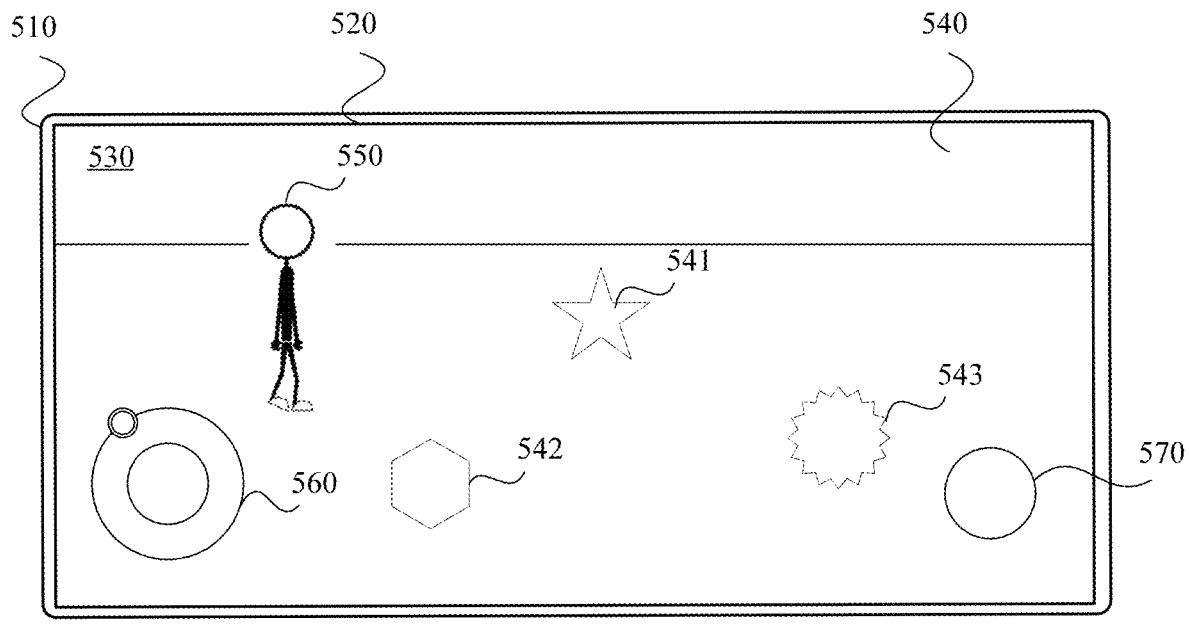
FIG. 5 is a schematic diagram of a user interface in a method for picking up a virtual item in a virtual environment according to an exemplary embodiment of this application.

Using an example in which the virtual environment is a two-dimensional virtual environment, as shown in FIG. 5, an application supporting the two-dimensional virtual environment is run on a terminal 510. A display screen 520 of the terminal 510 displays a user interface 530, and the user interface 530 displays a virtual environment 540, a virtual object 550, a virtual joystick 560, and a function control 570. The virtual environment 540 includes a first virtual item 541, a second virtual item 542, and a third virtual item 543.

The virtual object 550 may move in the virtual environment 540 according to a moving signal triggered on the virtual joystick 560. The virtual object 550 may perform an action on another virtual object or a virtual item in the virtual environment 540 by using an operation signal triggered on the function control 570, for example, picking up the virtual item or striking the another virtual object.

In step 402, according to a first instruction triggered by an interaction operation on the user interface, an operation trajectory can be obtained that is formed by the interaction operation on the user interface. The interaction operation is a continuous operation performed by a user on the user interface. For example, the interaction operation may be a continuous slide operation performed by the user on a touch display screen of a terminal, or may be an operation that the user releases a mouse after clicking the mouse and dragging for a specific distance on the user interface. In this embodiment, description is made by using an example in which the interaction operation is a slide operation. When a user performs the slide operation on the user interface, the terminal receives a first instruction triggered by the slide operation, and determines, according to the first instruction, an operation trajectory formed by the slide operation on the user interface.

Figure 6:
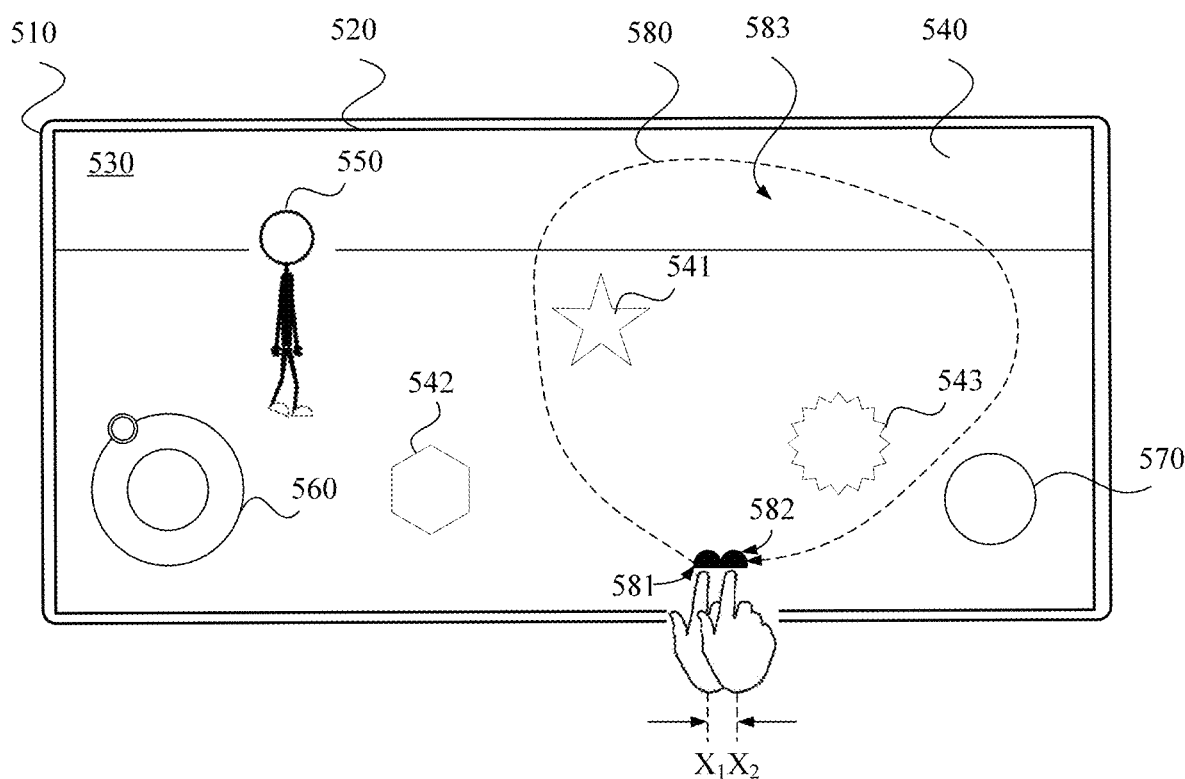
FIG. 6 is a schematic diagram of an operation trajectory in a method for picking up a virtual item in a virtual environment according to an exemplary embodiment of this application.

As shown in FIG. 6, the user initiates a slide operation of sliding from a beginning location X1 to an ending location X2 on the user interface, to trigger a first instruction. After the terminal 510 receives the first instruction, an operation trajectory 580 formed by the slide operation on the user interface is obtained.

In step 403, in a case that the operation trajectory forms an enclosed region, at least two target virtual items can be obtained that are located in the enclosed region in the virtual environment.

The terminal may detect whether the operation trajectory forms an enclosed region by using any one of the following manners.

(1) The terminal obtains a beginning region 581 formed by the user pressing down a finger at the beginning location X1 and an ending region 582 formed by removing the finger at the ending location X2, and detects whether an intersection exists between the beginning region 581 and the ending region 582. If an intersection exists between the beginning region 581 and the ending region 582, it is determined that the operation trajectory forms an enclosed region; and if no intersection exists between the beginning region 581 and the ending region 582, it is determined that the operation trajectory does not form an enclosed region.

(2) The terminal detects whether an intersection exists between the beginning region 581 and the ending region 582. If no intersection exists between the beginning region 581 and the ending region 582, it is determined that the operation trajectory does not form an enclosed region. If an intersection exists between the beginning region 581 and the ending region 582, an area proportion of the intersection is detected. If the area proportion exceeds an area proportion threshold, it is determined that the operation trajectory forms an enclosed region; and if the area proportion does not exceed the area proportion threshold, it is determined that the operation trajectory does not form an enclosed region. The area proportion is at least one of a proportion of an area of the intersection to an area of the beginning region, a proportion of the area of the intersection to an area of the ending region, and a proportion of the area of the intersection to a total area, such as the sum of the area of the beginning region and the area of the ending region.

(3) The terminal obtains a first distance between a central location of the beginning region 581 and a central location of the ending region 582, and detects whether the first distance is less than a first distance threshold. If the first distance is less than the first distance threshold, it is determined that the operation trajectory forms an enclosed region; and if the first distance is not less than the first distance threshold, it is determined that the operation trajectory does not form an enclosed region.

When the terminal determines that the operation trajectory forms an enclosed region, virtual items located in the enclosed region are obtained as target virtual items. For example, as shown in FIG. 6, the enclosed region 583 formed by the operation trajectory 580 has a first virtual item 541 and a third virtual item 543, and a second virtual item 542 is located outside the enclosed region 583. The terminal determines the first virtual item 541 and the third virtual item 543 as the target virtual items.

In step 404, the target virtual items in a designated location in the virtual environment can be aggregated. The designated location may be set according to actual requirements. For example, the designated location may be any location in the enclosed region touched by the user, or may be a location that is nearest to the virtual object in the enclosed region and that is obtained by the terminal through calculation, or may be a central location of the enclosed region that is obtained by the terminal through calculation.

Figure 7:
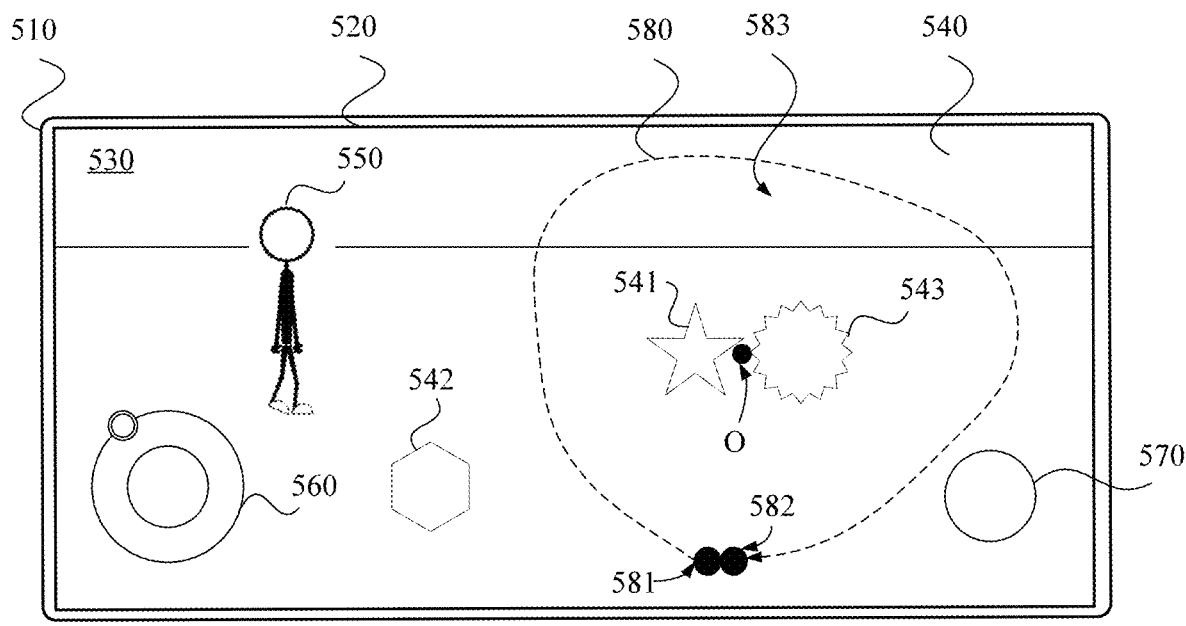
FIG. 7 is a schematic diagram of aggregating virtual items in a method for picking up a virtual item in a virtual environment according to an exemplary embodiment of this application.

For example, as shown in FIG. 7, after obtaining a central location O of the enclosed region 583 through calculation, the terminal moves and aggregates the target virtual items, that is, the first virtual item 541 and the third virtual item 543, to the central location O.

The terminal may receive a second instruction triggered by a touch operation in a touched location in the enclosed region, and uses the touched location as the designated location. For example, if the user touches a touch location in the enclosed region, the touch location may be used as the designated location.

Figure 8:
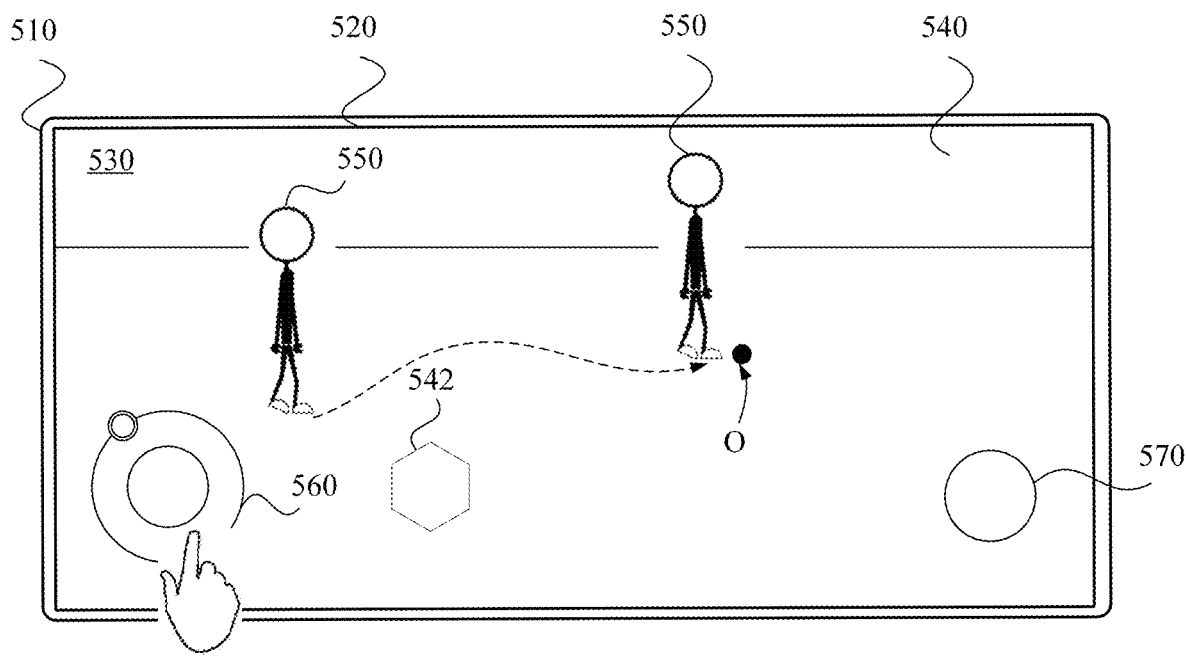
FIG. 8 is a schematic diagram of picking up virtual items in a method for picking up a virtual item in a virtual environment according to an exemplary embodiment of this application.

In step 405, in a case that the virtual object moves to the designated location, the virtual object can be controlled to pick up the target virtual items. In a case that the virtual object moves to the designated location, the terminal may control the virtual object to pick up the target virtual items manually or automatically. For example, as shown in FIG. 8, the user may control, by touching the virtual joystick 560, the virtual object 550 to move from an initial location A0 to the designated location O, to pick up the first virtual item 541 and the third virtual item 543 automatically.

In conclusion, in this embodiment of this application, an operation trajectory formed by an interaction operation on a user interface is obtained according to a first instruction triggered by the interaction operation on the user interface. In a case that the operation trajectory forms an enclosed region, virtual items located in the enclosed region in a virtual environment are aggregated in a designated location. In a case that a virtual object moves near to the designated location, the virtual items aggregated in the designated location are picked up. Because it does not need to control the virtual object to move to a location of each virtual item for pickup, pickup efficiency of virtual items is improved, thereby improving efficiency of human-computer interaction.

Figure 9:
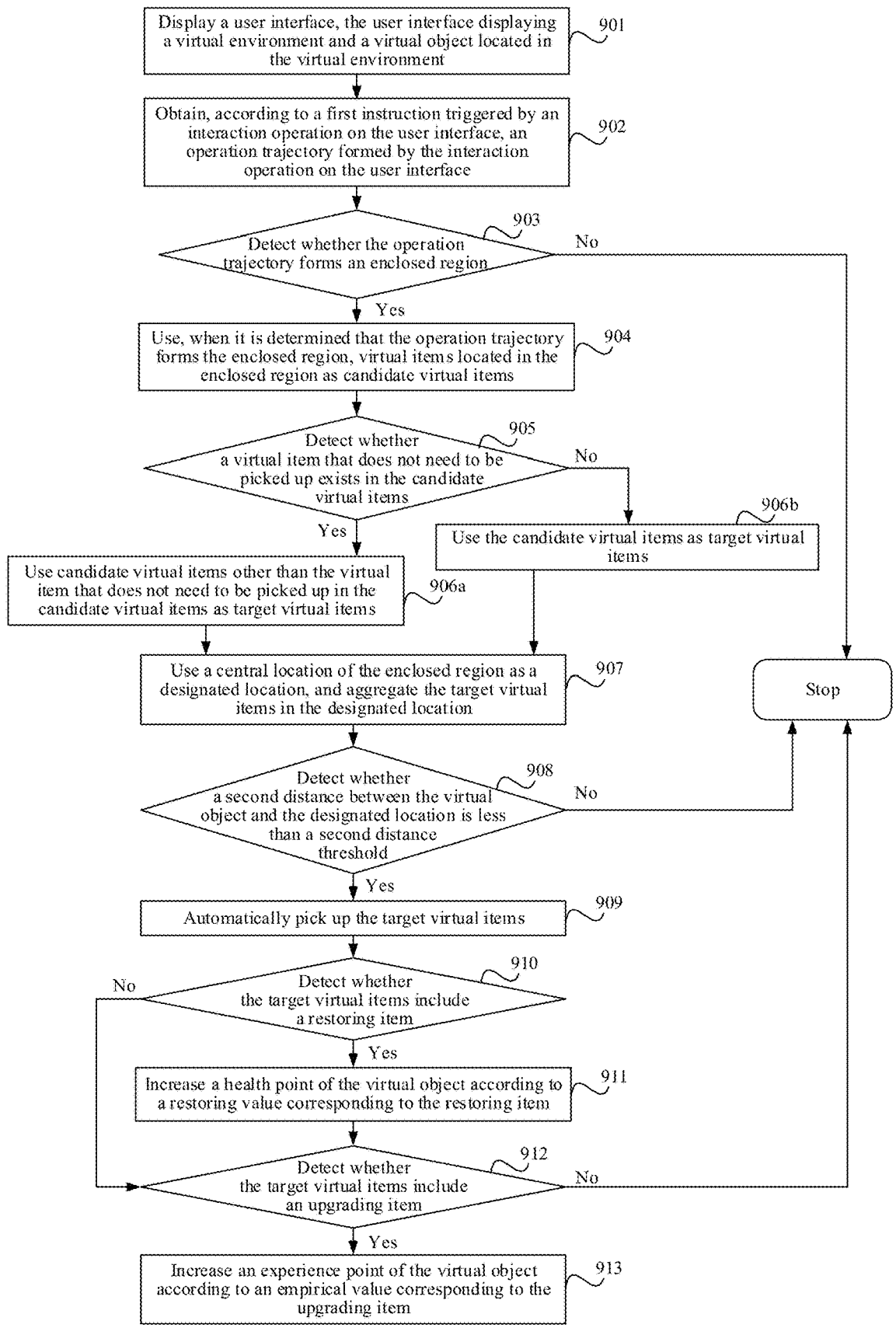
FIG. 9 is a flowchart of a method for picking up a virtual item in a virtual environment according to an exemplary embodiment of this application.

FIG. 9 is a flowchart of a method for picking up a virtual item in a virtual environment according to an exemplary embodiment of this application. As shown in FIG. 9, the method is performed by using the first terminal 220 or the second terminal 260 in the embodiment of FIG. 2. The method includes the following steps:

In step 901, a user interface can be displayed, the user interface displaying a virtual environment and a virtual object located in the virtual environment. For the step of displaying a user interface by the terminal, refer to step 401 in the embodiment of FIG. 4.

In step 902, according to a first instruction triggered by an interaction operation on the user interface, an operation trajectory can be obtained that is formed by the interaction operation on the user interface. An example in which the interaction operation is a slide operation on a touch display screen of the terminal is used. When a user performs the slide operation on the user interface, the terminal receives a first instruction triggered by the slide operation, and determines, according to the first instruction, an operation trajectory formed by the slide operation on the user interface.

As shown in FIG. 6, the user initiates a slide operation of sliding from a beginning location X1 to an ending location X2 on the user interface, to trigger a first instruction. After the terminal 510 receives the first instruction, an operation trajectory 580 formed by the slide operation on the user interface is obtained. For example, the first instruction triggered by the slide operation of the user on the touch display screen includes three instruction events: a touchstart event in which a finger is pressed down on the touch display screen, a touchmove event in which a finger slides on the touch display screen, and a touchend event in which a finger is removed from the touch display screen. The terminal obtains a beginning region 581 according to the touchstart event, an ending region 582 according to the touchend event, and the operation trajectory 580 according to the touchmove event.

In step 903, it can be detected whether the operation trajectory forms an enclosed region. A manner in which the terminal detects whether the operation trajectory forms an enclosed region may be any one of the three manners in step 403 in the embodiment of FIG. 4.

In step 904, when it is determined that the operation trajectory forms the enclosed region, at least two target virtual items located in the enclosed region can be used as candidate virtual items. A virtual item corresponds to a pickup region, and the pickup region is an area occupied by the virtual item in the virtual environment. The terminal may determine candidate virtual items according to pickup regions as required. Optionally, in virtual items, the terminal uses virtual items in intersection regions between pickup regions and the enclosed region as candidate virtual items.

Figure 10:
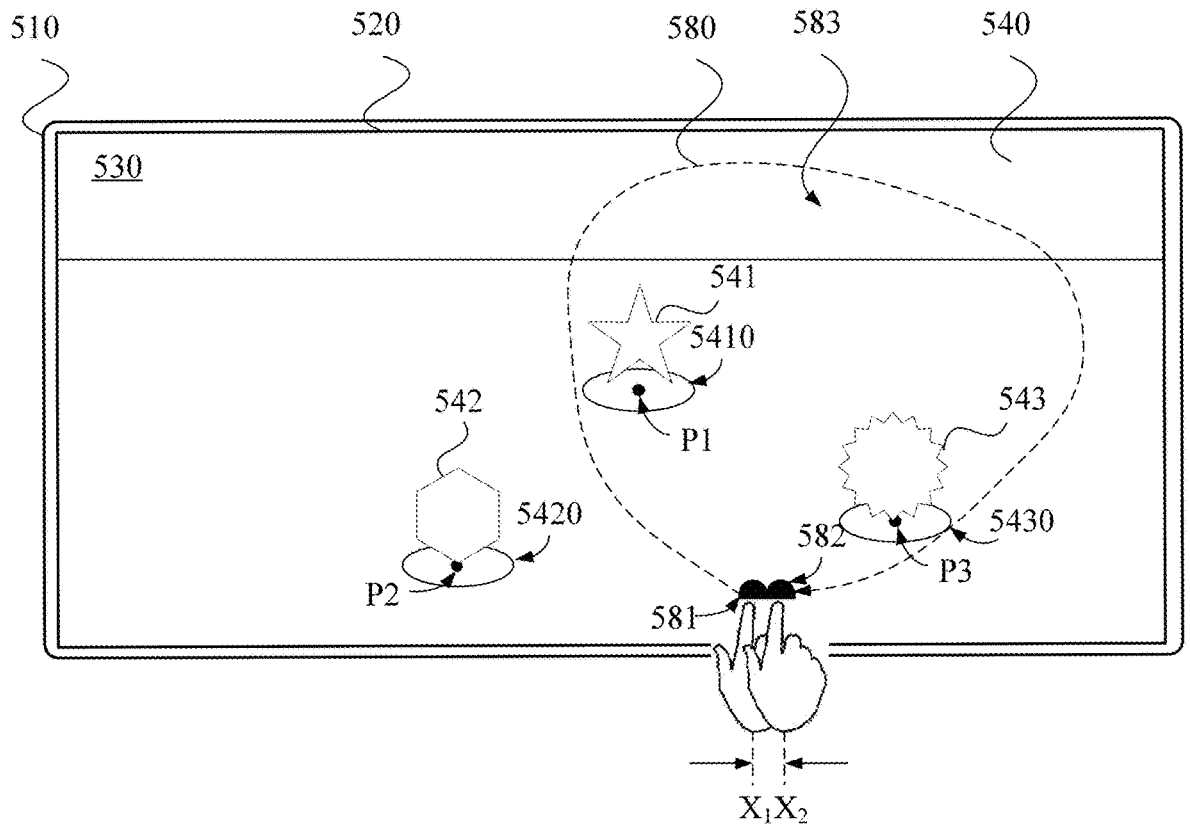
FIG. 10 is a schematic diagram of a pickup region of a virtual item according to an exemplary embodiment of this application.

For example, as shown in FIG. 10, the first virtual item 541 corresponds to a pickup region 5410, the second virtual item 542 corresponds to a pickup region 5420, and the third virtual item 543 corresponds to a pickup region 5430. The pickup region 5410 and the pickup region 5430 are located in the enclosed region 583. Therefore, an intersection of the pickup region 5410 and the enclosed region 583 is the pickup region 5410, and an intersection of the pickup region 5430 and the enclosed region 583 is the pickup region 5430. However, because the pickup region 5420 is located outside the enclosed region 583 and does not intersect with the enclosed region, the first virtual item 541 and the third virtual item 543 are the candidate virtual items.

Optionally, in the virtual items, the terminal uses virtual items located in pickup regions of which central locations are in the enclosed region as candidate virtual items. For example, as shown in FIG. 10, the terminal obtains coordinates of a central location P1 of the pickup region 5410 corresponding to the first virtual item 541, coordinates of a central location P2 of the pickup region 5420 corresponding to the second virtual item 542, and coordinates of a central location P3 of the pickup region 5430 corresponding to the third virtual item 543, detects that P1 and P3 are located in the enclosed region 583, and P2 is located outside the enclosed region 583 according to the coordinates of P1, P2, and P3 and coordinates of pixel points corresponding to the enclosed region, thereby determining that the first virtual item 541 and the third virtual item 543 are the candidate virtual items.

In step 905, it can be detected whether a virtual item that does not need to be picked up exists in the candidate virtual items. Optionally, the terminal detects whether the candidate virtual items include a virtual item that does not need to be picked up. When the candidate virtual items include a virtual item that does not need to be picked up, step 906a is performed; and when the candidate virtual items do not include a virtual item that does not need to be picked up, step 906b is performed.

The virtual item that does not need to be picked up refers to a virtual item whose item type is an item type that does not need to be picked up specified in the application. The virtual item that does not need to be picked up may be preset by the application, or may be set by a user. For example, a user is not good at using a handgun, and may set a virtual item of a handgun type as a virtual item that does not need to be picked up.

Figure 11:
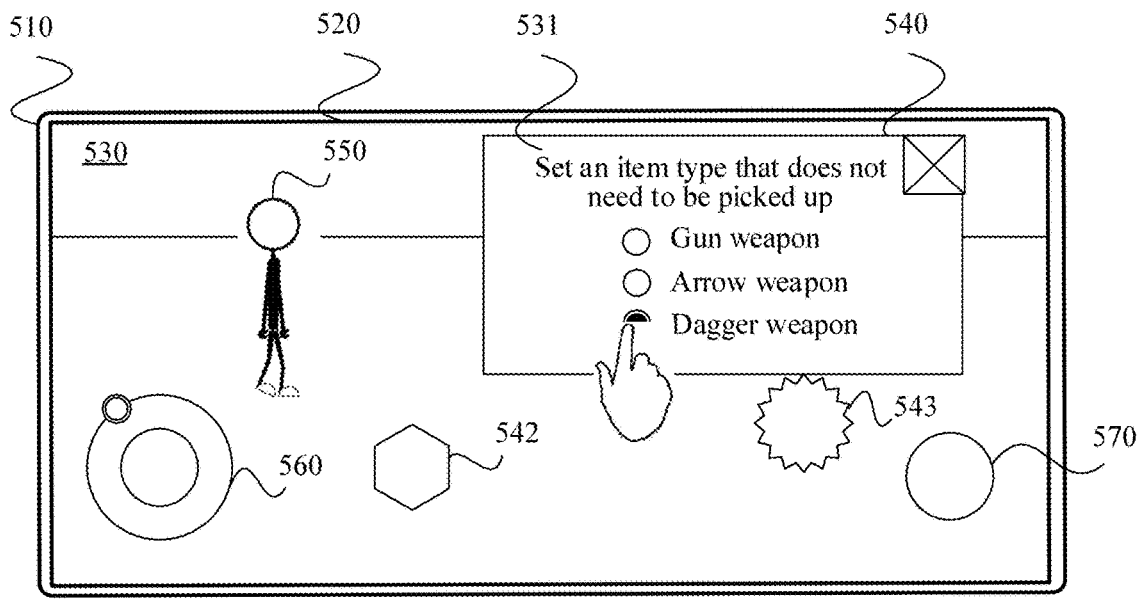
FIG. 11 is a schematic diagram of a setting page of virtual items that do not need to be picked up according to an exemplary embodiment of this application.

For example, as shown in FIG. 11, before the terminal receives the first instruction triggered by the slide operation, and after an item setting signal is triggered on a setting control, the terminal displays an item setting page 531 in the user interface 530. The item setting page displays an item type 1, an item type 2, and an item type 3. After receiving an item type determining signal triggered on the item type 1, the terminal determines a virtual item corresponding to the item type 1 as a virtual item that does not need to be picked up.

Optionally, after determining the candidate virtual items, the terminal detects whether a virtual item that is the same as an item carried by the virtual object and whose item quantity exceeds a quantity threshold exists. In a case that the candidate virtual items include the virtual item whose item quantity exceeds the quantity threshold, the virtual item whose item quantity exceeds the quantity threshold is used as an excess item, and the excess item is used as a virtual item that does not need to be picked up.

For example, items carried by the virtual object have corresponding item quantities. For example, the virtual object may carry a rifle, a handgun, 120 rifle bullets, and 120 handgun bullets. An item type corresponding to a rifle and a handgun is firearm, an item type corresponding to a rifle bullet is rifle ammunition, and an item type corresponding to a handgun bullet is handgun ammunition. A quantity threshold corresponding to the firearm is 1, a quantity threshold corresponding to the rifle ammunition is 119, and a quantity threshold corresponding to the handgun ammunition is 119. When the virtual object carries a rifle and 120 rifle bullets, if a candidate virtual item 1 is a handgun, a candidate virtual item 2 is 120 rifle bullets, and a candidate virtual item 3 is 120 handgun bullets, because the rifle ammunition is a virtual item whose item quantity exceeds the quantity threshold, the virtual item 2 is a virtual item that does not need to be picked up.

In step 906a, candidate virtual items other than the virtual item that does not need to be picked up in the candidate virtual items can be used as the target virtual items. After determining a virtual item that does not need to be picked up in the candidate virtual items, the terminal uses candidate virtual items other than the virtual item that does not need to be picked up in the candidate virtual items as the target virtual items.

In step 906b, the candidate virtual items can be used as the target virtual items. After determining that a virtual item that does not need to be picked up does not exist in the candidate virtual items, the terminal uses the candidate virtual items as the target virtual items.

In step 907, a central location of the enclosed region can be used as a designated location, and the target virtual items can be aggregated in the designated location. For example, as shown in FIG. 7, after obtaining a central location O of the enclosed region 583 through calculation, the terminal moves and aggregates the target virtual items, that is, the first virtual item 541 and the third virtual item 543, to the central location O. For example, the terminal obtains, according to an area of a region occupied by each target virtual item, an area of a region that centers coordinates of the central location O and that needs to be occupied by all the target virtual items, determines an aggregation region occupied by all the target virtual items, and randomly moves each target virtual item to any location in the aggregation region or moves each target virtual item to a location, in the aggregation region, nearest to the target virtual item.

Optionally, after aggregating the target virtual items in the designated location, the terminal displays the at least two target virtual items in the designated location in a form of an aggregation icon.

Not all the target virtual items after aggregation needs to be displayed in the designated location, and all the target virtual items may be displayed by using an aggregation icon. For example, after the target virtual item 1, the target virtual item 2, and the target virtual item 3 are aggregated in the designated location O, an icon of only one target virtual item is displayed; alternatively, a preset aggregation icon is displayed to denote the target virtual item 1, the target virtual item 2, and the target virtual item 3.

Optionally, after aggregating the target virtual items in the designated location in the virtual environment, the terminal displays virtual items that belong to the same item type in the at least two target virtual items as one icon. For example, item types of both the target virtual item 1 and the target virtual item 2 are bag, and an item type of the target virtual item 3 is firearm. When the target virtual item 1, the target virtual item 2, and the target virtual item 3 are aggregated in the designated location O, only icons of the target virtual item 1 (or the target virtual item 2) and the target virtual item 3 are displayed. Optionally, the terminal displays a quantity of target virtual items of the same type on an icon of the target virtual items of the same type. For example, "x2" is displayed on an icon of the target virtual item 1, indicating that an identifier of the target virtual item 1 represents two target virtual items of the same type.

In step 908, it can be detected whether a second distance between the virtual object and the designated location is less than a second distance threshold. The virtual object has corresponding coordinates in the virtual environment. The terminal calculates a second distance between the virtual object and the designated location according to the coordinates of the virtual object and coordinates of the designated location, and determines, according to the second distance, whether the virtual object moves to the designated location.

In step 909, the target virtual items can be automatically picked up in a case that the second distance is less than the second distance threshold. When the second distance between the virtual object and the designated location is less than the second distance threshold, and the terminal determines that the virtual object moves to the designated location, the target virtual items are picked up automatically. For example, as shown in FIG. 8, the user may control, by touching the virtual joystick 560, the virtual object 550 to move from an initial location A0 to the designated location O, to pick up the first virtual item 541 and the third virtual item 543 automatically.

In step 910, it can be detected whether the target virtual items include a restoring item. After the virtual object picks up the target virtual items, the terminal detects whether the target virtual items picked up by the virtual object include a restoring item. If the target virtual items include a restoring item, step 911 is performed; and if the target virtual items do not include a restoring item, step 912 is performed.

Step 911. Increase a health point of the virtual object according to a restoring value corresponding to the restoring item.

In a case that the target virtual items include a restoring item, the terminal increases a health point of the virtual object according to a restoring value corresponding to the restoring item. For example, the target virtual items include a restoring item 1 and a restoring item 2. A restoring value corresponding to the restoring item 1 is 10, and a restoring value corresponding to the restoring item 2 is 15. A health point of the virtual object is 40, and an upper limit of the health point of the virtual object is 100. The terminal increases the health point of the virtual object from 40 to 50 according to the restoring value of the restoring item 1, and increases the health point of the virtual object from 50 to 65 according to the restoring value of the restoring item 2. A sequence of increasing the health point of the virtual object by the terminal according to restoring items with different restoring values is not limited.

In step 912, it can be detected whether the target virtual items include an upgrading item. The terminal detects whether the target virtual items obtained by the virtual object include an upgrading item. If the target virtual items include an upgrading item, step 913 is performed; and if the target virtual items do not include an upgrading item, this step is stopped.

In step 913, an experience point of the virtual object can be upgraded according to an experience point corresponding to the upgrading item. In a case that the target virtual items include an upgrading item, the terminal increases an experience point of the virtual object according to an experience point corresponding to the upgrading item. After the experience point of the virtual object is increased to a value that exceeds an upper limit of an experience point of a current level, the virtual object is upgraded to a corresponding level according to the increased experience point.

For example, the target virtual items include an upgrading item 1 and an upgrading item 2. An experience point corresponding to the upgrading item 1 is 100, and an experience point corresponding to the upgrading item 2 is 150. An experience point of the virtual object is 500, a level of the virtual object is 1, and an upper limit of an experience point corresponding to level 1 is 600. The terminal increases the experience point of the virtual object from 500 to 600 according to the experience point of the upgrading item 1, and increases the experience point of the virtual object from 600 to 750 according to the experience point of the upgrading item 2. Because the experience point of 750 exceeds the upper limit of the experience point of level 1, the level of the virtual object is upgraded from level 1 to level 2. A sequence of increasing the experience point of the virtual object by the terminal according to upgrading items with different experience points is not limited.

The terminal may first perform step 911 and step 912, and then perform step 913 and step 914. Alternatively, the terminal may first perform step 913 and step 914, and then perform step 911 and step 912. Of course, the disclosure is not limited to this.

In conclusion, in this embodiment of this application, an operation trajectory formed by an interaction operation on a user interface is obtained according to a first instruction triggered by the interaction operation on the user interface. In a case that the operation trajectory forms an enclosed region, virtual items located in the enclosed region in a virtual environment are aggregated in a designated location. In a case that a virtual object moves near to the designated location, the virtual items aggregated in the designated location are picked up. Because it does not need to control the virtual object to move to a location of each virtual item for pickup, pickup efficiency of virtual items is improved, thereby improving efficiency of human-computer interaction.

In this embodiment of this application, the virtual items in the enclosed region can be formed by the operation trajectory are used as candidate virtual items, a virtual item that does not need to be picked up is determined in the candidate virtual items, and candidate virtual items other than the virtual item that does not need to be picked up in the candidate virtual items are used as target virtual items. Therefore, it is avoided that the terminal aggregates candidate virtual items that do not need to be picked up in the designated location, so that the virtual object does not pick up the virtual item that does not need to be picked up when moving to the designated location, thereby improving pickup efficiency of virtual items, and further improving efficiency of human-computer interaction.

Optionally, in this embodiment of this application, after the target virtual items are aggregated in the designated location, at least two target virtual items are displayed in the designated location in a form of an aggregation icon. Therefore, a quantity of images displayed in the same screen of the terminal is reduced, and fewer resources of the terminal are occupied, thereby improving execution fluency of the application to a specific extent.

In this embodiment of this application, after the target virtual items can be aggregated in the designated location in the virtual environment, target virtual items of the same item type in the at least two target virtual items are displayed as one icon. Therefore, in some cases, a quantity of images displayed in the same screen of the terminal can be reduced, and fewer resources of the terminal are occupied, thereby improving execution fluency of the application to a specific extent.

It is to be understood that although each step of the flowcharts in FIG. 4 and FIG. 9 is shown sequentially according to arrows, the steps are not necessarily performed according to an order indicated by the arrows. Unless explicitly specified in this application, the sequence of the steps is not strictly limited, and the steps may be performed in other sequences. Moreover, at least some of the steps in FIG. 4 and FIG. 9 may include a plurality of sub-steps or a plurality of stages. The sub-steps or stages are not necessarily performed at the same moment, but may be performed at different moments. The sub-steps or stages are not necessarily performed sequentially, but may be performed in turn or alternately with at least one part of the other steps or sub-steps of other steps or stages.

Figure 12:
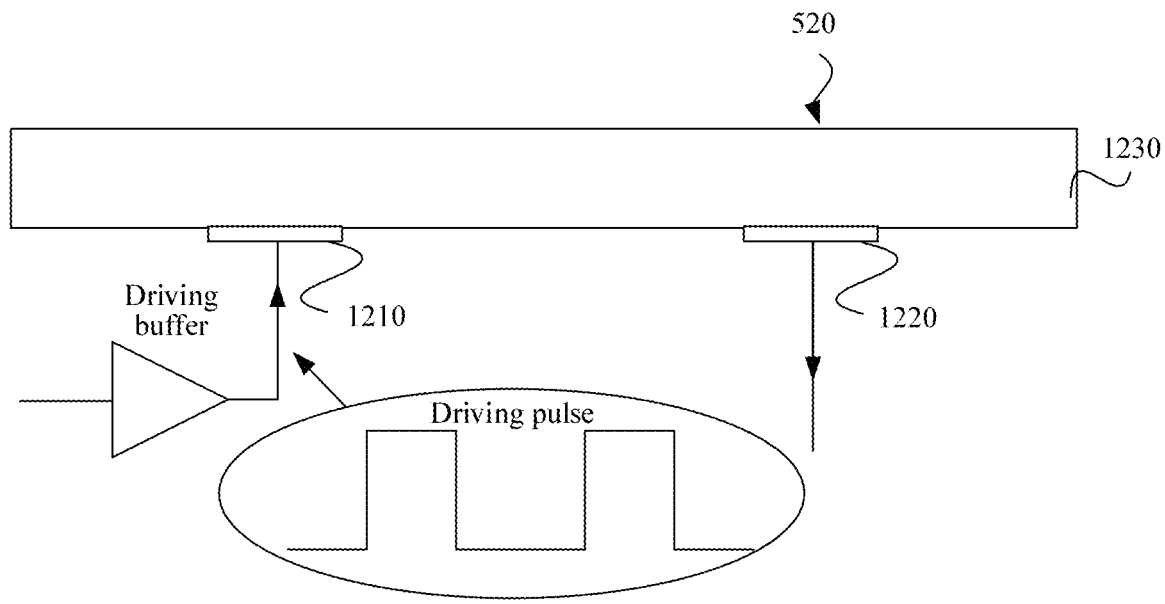
FIG. 12 is a schematic diagram of obtaining a touch signal according to an exemplary embodiment of this application.

In the embodiments of this application, the terminal may obtain the operation trajectory of the touch slide operation by combining a hardware level and a program level, and a principle is as follows:

1. Hardware Level:

As shown in FIG. 12, a principle of detecting a slide operation by a touch display screen is as follows: the touch display screen 520 of the terminal 510 is plated with a driving electrode 1210 and a receiving electrode 1220. A driving pulse is provided between the driving electrode 1210 and the receiving electrode 1220 by a driving buffer, to form a low-pressure alternating current field. When a finger touches the touch display screen 520, due to electrical conductivity of a human body, a coupling capacitor is formed between the finger and a dielectric layer 1230 of the touch display screen 520. A current outputted by the driving electrode 1210 and the receiving electrode 1220 flows to a touch point of the touch display screen 520 at which the finger touches, a trigger signal is generated between an inner layer and an outer layer of the touch display screen 520 through a middle metal oxide, and a central processing unit of the terminal obtains an operation trajectory of the finger slide operation through the trigger signal.

Figure 13:
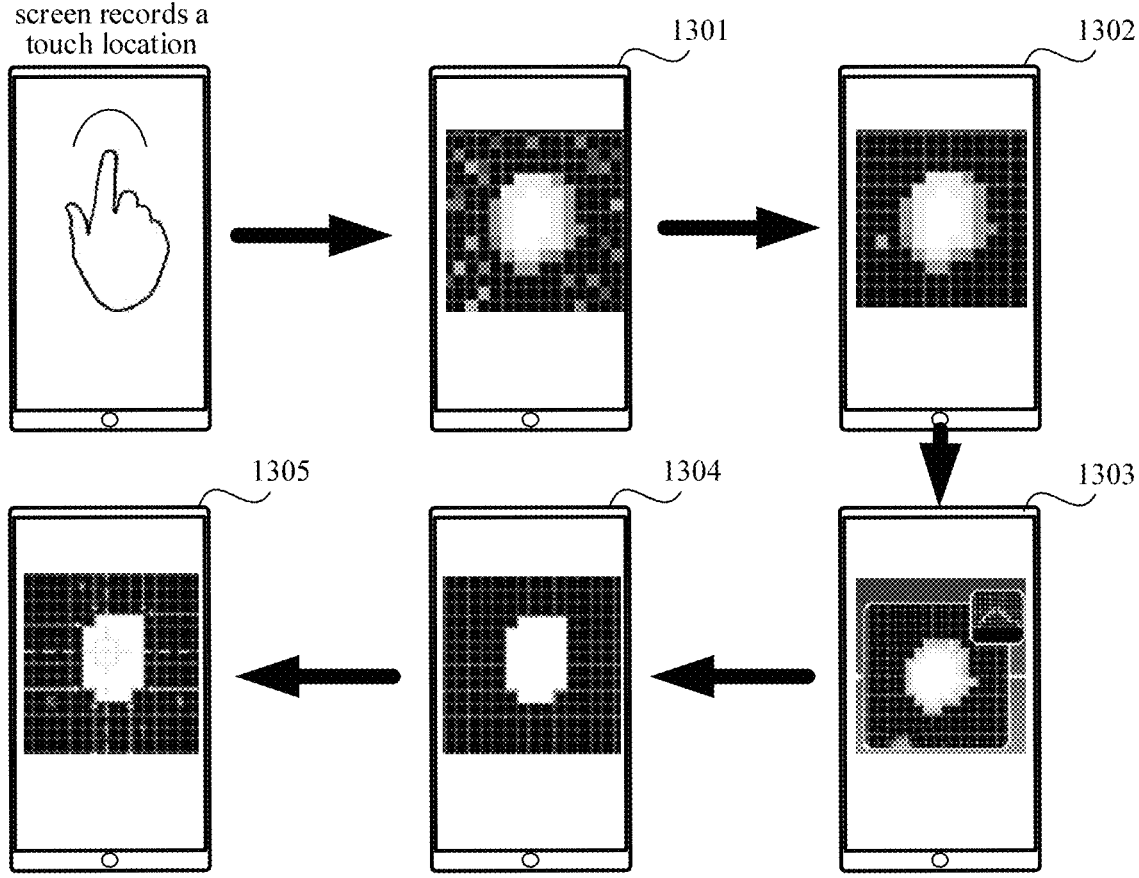
FIG. 13 shows processing steps of a touch signal according to an exemplary embodiment of this application.

As shown in FIG. 13, a finger and a touch screen form a contact region. A process of obtaining touch coordinates by the terminal through the contact region includes the following steps: step 1301, the terminal obtains an original signal of the contact region, the original signal being an original touch signal of the contact region and including an interfering signal; step 1302, the terminal performs filtering on the interfering signal, to obtain a filtered touch signal; step 1303, calculate a pressure point of the filtered touch signal, to obtain pressure distribution of the touch signal; step 1304, establish a touch region according to the pressure distribution of the touch signal; and step 1305, obtain the touch coordinates according to the touch region. Therefore, coordinates of the operation trajectory may be obtained according to the touch coordinates, and edge coordinates of the enclosed region and coordinates of pixel points enclosed by the edge coordinates of the enclosed region are further determined.

2. Program Level:

When touch of a user is detected at the foregoing hardware level, a touch event is triggered in an operating system of the terminal. The touch event in the operating system of the terminal is triggered when the user puts the finger on the screen, slides the finger on the screen, or removes the finger from the screen. There may be several types of touch events as follows.

Touchstart event: this event is triggered when a finger starts to touch the screen. Even if one finger has been put on the screen, the event may still be triggered when another finger touches the screen.

Touchmove event: this event is continuously triggered when a finger slides on the screen. During the occurrence of this event, rolling may be prevented by invoking a preventDefault ( ) event.

Touchend event: this event is triggered when the finger is removed from the screen.

Touchcancel event: this event is triggered when a system stops touch tracking.

Figure 14:
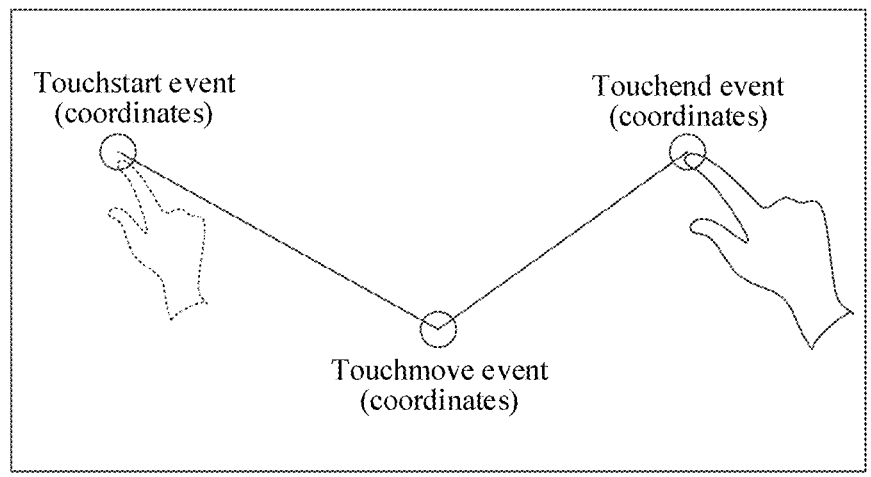
FIG. 14 is a schematic diagram of touch events according to an exemplary embodiment of this application.

The application in the terminal may obtain, through the touch events obtained at the foregoing program level, an operation trajectory of a drawing operation performed in a path drawing interface. For example, FIG. 14 shows a schematic diagram of determining an operation trajectory according to touch events in an embodiment of this application. As shown in FIG. 14, the terminal may obtain, according to coordinates respectively corresponding to a touchstart event, a touchend event, and a touchmove event between the touchstart event and the touchend event, an operation trajectory of a drawing operation performed in a path drawing interface.

Figure 15:
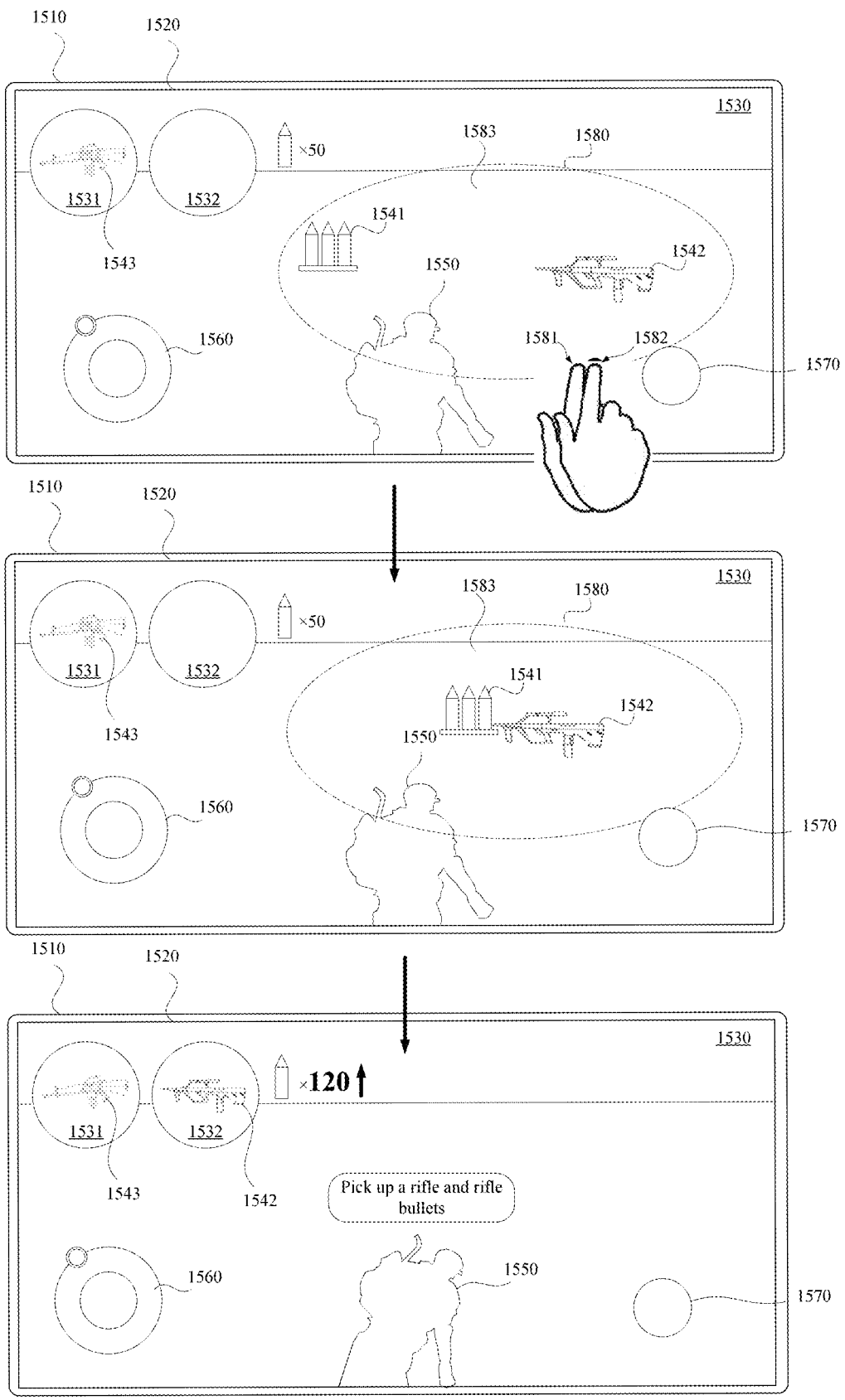
FIG. 15 shows a method for picking up a virtual item in a three-dimensional multiplayer shooting survival game according to an exemplary embodiment of this application.

In an example, the application in this embodiment of this application is a three-dimensional multiplayer shooting survival game. As shown in FIG. 15, a display screen 1520 of a terminal 1510 displays a user interface 1530 of the three-dimensional multiplayer shooting survival game. The user interface 1530 displays a virtual environment 1540, a virtual object 1550 corresponding to the terminal 1510, a first weapon inventory table 1531 and a second weapon inventory table 1532 corresponding to the virtual object 1550, a virtual joystick 1560, and a function control 1570. The virtual environment 1540 includes a first virtual item 1541 (a rifle bullet) and a second virtual item 1542 (a first rifle). The first weapon inventory table 1531 and the second weapon inventory table 1532 are used for displaying weapons carried by the virtual object 1550, and a second rifle 1543 displayed in the first weapon inventory table 1531 is a rifle carried by the virtual object 1550. For functions of the virtual joystick 1560 and the function control 1570, refer to the foregoing embodiments.

After receiving a first instruction triggered by an interaction operation on the user interface 1530, the terminal 1510 obtains an operation trajectory 1580 formed by the interaction operation. After it is determined, according to a beginning region 1581 and an ending region 1582 of the operation trajectory, that the operation trajectory 1580 forms an enclosed region 1583, the rifle bullet 1541 and the first rifle 1542 located in the enclosed region 1583 are aggregated in a central location of the enclosed region 1583. When the virtual object 1550 moves to the central location of the enclosed region 1583, after the terminal 1510 controls the virtual object 1550 to pick up the rifle bullet 1541 and the first rifle 1542, the second weapon inventory table 1532 displays an image of the first rifle 1542, and a number corresponding to a rifle bullet icon is updated from 50 before the pickup to 120 after the pickup.

Figure 16:
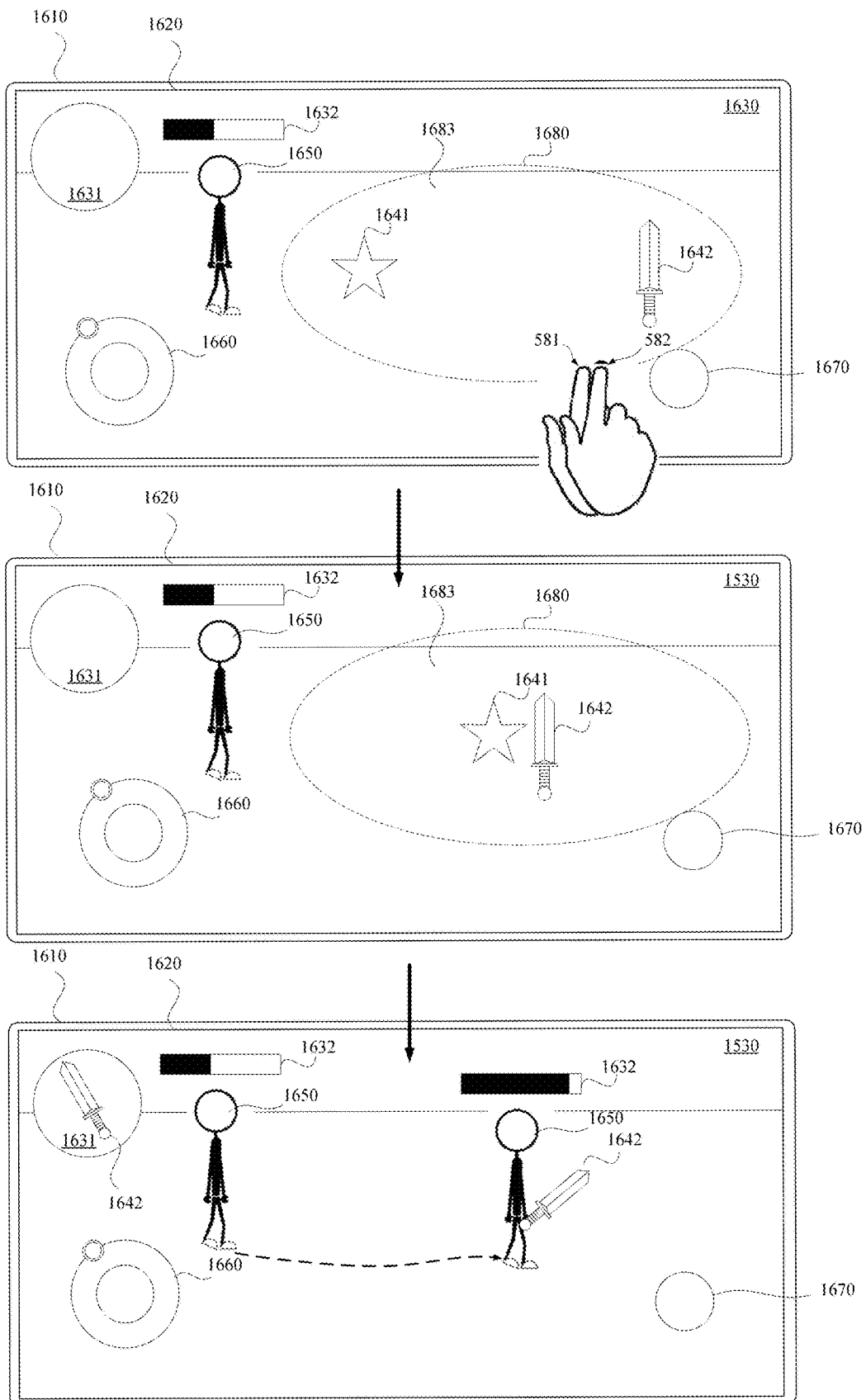
FIG. 16 shows a method for picking up a virtual item in a two-dimensional multiplayer battle game according to an exemplary embodiment of this application.

In an example, the application in this embodiment of this application is a two-dimensional multiplayer battle game. As shown in FIG. 16, a display screen 1620 of a terminal 1610 displays a user interface 1630 of the two-dimensional multiplayer battle game. The user interface 1630 displays a virtual environment 1640, a virtual character 1650 corresponding to the terminal 1610, a weapon inventory table 1631 and a health point display bar 1632 corresponding to the virtual character 1650, a virtual joystick 1660, and a function control 1670. The virtual environment 1640 includes a first virtual item 1641 (that is, a restoring item) and a second virtual item 1642 (a sword). The weapon inventory table 1631 is used for displaying weapons carried by the virtual character 1650. The health point display bar 1632 is used for displaying a health point of the virtual character 1650, a dark part indicating a current health point of the virtual character 1650, and a blank part indicating a difference value between the current health point and an upper limit of the health point. For functions of the virtual joystick 1660 and the function control 1670, refer to the foregoing embodiments.

After receiving a first instruction triggered by an interaction operation on the user interface 1630, the terminal 1610 obtains an operation trajectory 1680 formed by the interaction operation. After it is determined, according to a beginning region 1681 and an ending region 1682 of the operation trajectory, that the operation trajectory 1680 forms an enclosed region 1683, the restoring item 1641 and the sword 1642 located in the enclosed region 1683 are aggregated in a central location of the enclosed region 1683. When the virtual character 1650 moves to the central location of the enclosed region 1683, after the terminal 1610 controls the virtual character 1650 to pick up the restoring item 1641 and the sword 1642, the weapon inventory table 1631 displays an image of the sword 1642, and the current health point in the health point display bar 1632 is increased.

Figure 17:
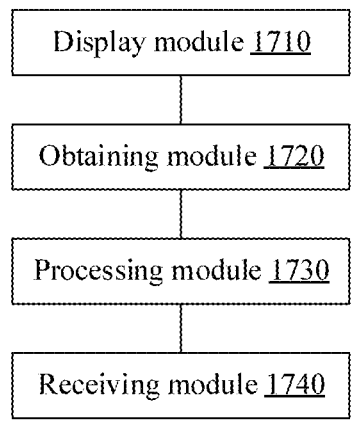
FIG. 17 is a structural block diagram of an apparatus for picking up a virtual item in a virtual environment according to an exemplary embodiment of this application.

FIG. 17 is a structural block diagram of an apparatus for picking up a virtual item in a virtual environment according to an exemplary embodiment of this application. The apparatus may be implemented as the first terminal 220 or the second terminal 260 in the embodiment of FIG. 2 by using software, hardware, or a combination thereof. The apparatus can include a display module 1710, an obtaining module 1720, a processing module 1730, and a receiving module 1740. Of course, it should be understood that one or more of the modules described in this disclosure can be implemented by processing circuitry.

The display module 1710 is configured to display a user interface, the user interface displaying a virtual environment and a virtual object located in the virtual environment.

The obtaining module 1720 is configured to obtain, according to a first instruction triggered by an interaction operation on the user interface, an operation trajectory formed by the interaction operation on the user interface. In a case that the operation trajectory forms an enclosed region, at least two target virtual items located in the enclosed region in the virtual environment are obtained.

The processing module 1730 is configured to aggregate the target virtual items in a designated location in the virtual environment; and control, in a case that the virtual object moves to the designated location, the virtual object to pick up the target virtual items.

In an optional embodiment, each virtual item has a pickup region.

The obtaining module 1720 is further configured to use virtual items, in the virtual items, of which pickup regions intersect with the enclosed region as candidate virtual items; or use virtual items, in the virtual items, of which pickup regions have central locations that are in the enclosed region as candidate virtual items; and use virtual items that need to be picked up in the candidate virtual items as the target virtual items.

In an optional embodiment, each virtual item has an item type.

The obtaining module 1720 is further configured to determine whether the candidate virtual items include a virtual item that does not need to be picked up, the virtual item that does not need to be picked up referring to a virtual item whose item type is an item type that does not need to be picked up specified in the application; and use, in a case the candidate virtual items include a virtual item that does not need to be picked up, candidate virtual items other than the virtual item that does not need to be picked up in the candidate virtual items as the target virtual items; or use, in a case the candidate virtual items do not include a virtual item that does not need to be picked up, the candidate virtual items as the target virtual items.

In an optional embodiment, the display module 1710 is further configured to display an item setting page.

The receiving module 1740 is configured to receive an item type determining signal triggered on the item setting page.

The processing module 1730 is configured to determine, according to the item type determining signal, an item type that does not need to be picked up.

In an optional embodiment, each virtual item corresponds to an item quantity.

The obtaining module 1720 is further configured to determine whether a virtual item whose item quantity exceeds a quantity threshold exists in the candidate virtual items; and use, in a case that the candidate virtual items include the virtual item whose item quantity exceeds the quantity threshold, the virtual item whose item quantity exceeds the quantity threshold as an excess item, and use candidate virtual items other than the excess item in the candidate virtual items as the target virtual items; or use, in a case that the candidate virtual items do not include the excess item, the candidate virtual items as the target virtual items.

In an optional embodiment, the receiving module 1740 is further configured to receive a second instruction triggered by a touch operation in a touched location in the enclosed region.

The processing module 1730 is further configured to use the touched location as the designated location according to the second instruction.

In an optional embodiment, the obtaining module 1720 is further configured to obtain a central location of the enclosed region.

The processing module 1730 is further configured to use the central location of the enclosed region as the designated location.

In an optional embodiment, the processing module 1730 is further configured to increase, in a case that the target virtual items include a restoring item, a health point of the virtual object according to a restoring value corresponding to the restoring item.

In an optional embodiment, the processing module 1730 is further configured to increase, in a case that the target virtual items include an upgrading item, an experience point of the virtual object according to an experience point corresponding to the upgrading item.

In an optional embodiment, the display module 1710 is further configured to display the at least two target virtual items in the designated location in a form of an aggregation icon after the target virtual items are aggregated in the designated location in the virtual environment.

The display module 1710 can be further configured to display, after the target virtual items are aggregated in the designated location in the virtual environment, target virtual items whose item types are the same in the at least two target virtual items as one icon.

In an optional embodiment, the interaction operation is a slide operation on a touch display screen of the terminal, and an operation trajectory of the slide operation includes a beginning region and an ending region, the beginning region being a region formed by a finger pressing-down operation in the slide operation on a display screen of the terminal, and the ending region being a region formed by a finger removing operation in the slide operation on the display screen of the terminal.

The processing module 1730 is further configured to determine, according to the beginning region and the ending region, whether the operation trajectory forms the enclosed region.

In an optional embodiment, the processing module 1730 is further configured to obtain a first distance between a central location of the beginning region and a central location of the ending region, and determine, in a case that the first distance is less than a first distance threshold, that the operation trajectory forms the enclosed region.

In an optional embodiment, the processing module 1730 is further configured to obtain an area of an intersection between the beginning region and the ending region; and determine, in a case that an area proportion of the intersection exceeds an area proportion threshold, that the operation trajectory forms the enclosed region, the area proportion being a proportion of the area of the intersection to a total area, the total area being a sum of an area of the beginning region and an area of the ending region.

In an optional embodiment, the processing module 1730 is further configured to obtain a second distance between the virtual object and the designated location; and automatically pick up the target virtual items in a case that the second distance is less than a second distance threshold.

Figure 18:
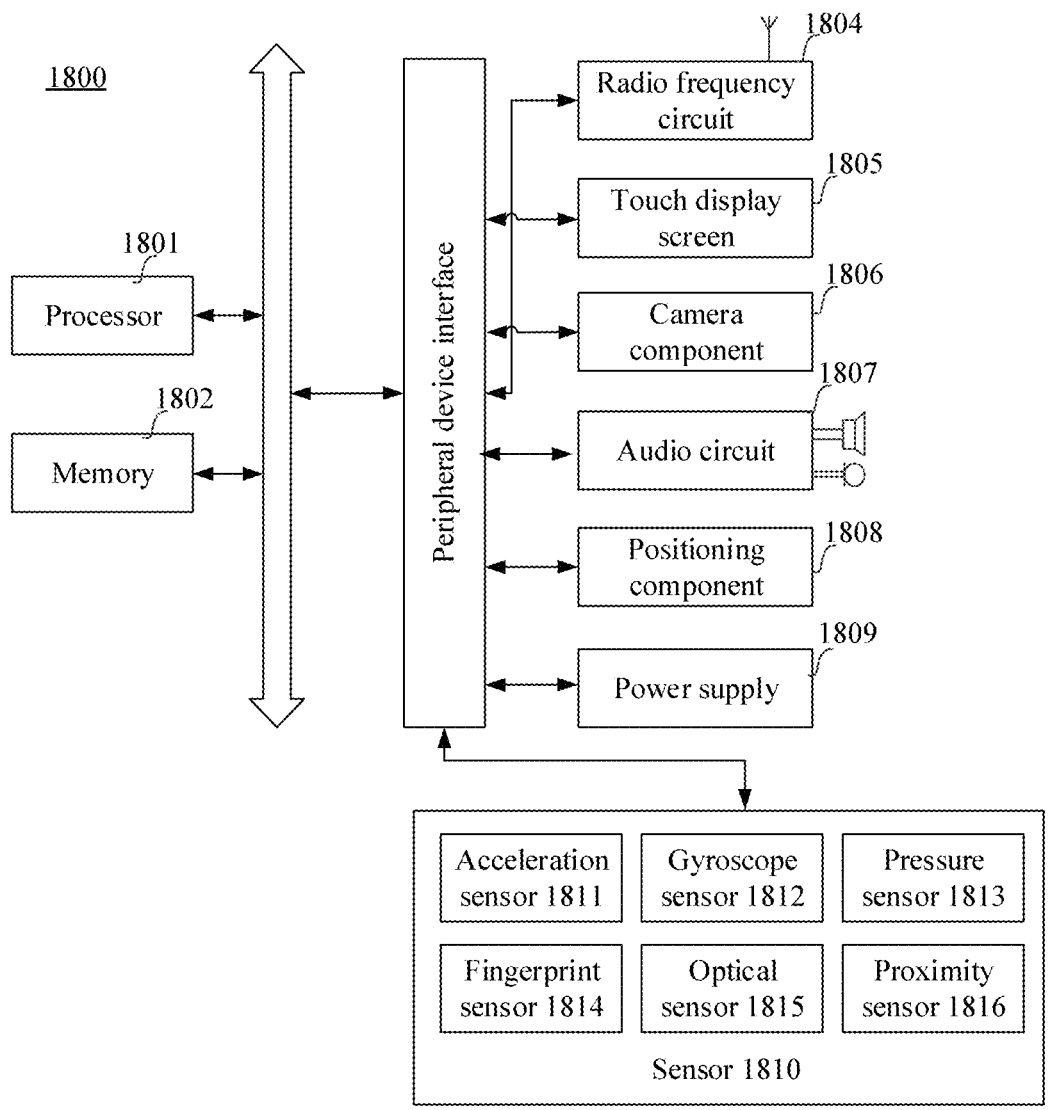
FIG. 18 is a schematic structural diagram of a terminal according to an exemplary embodiment of this application.

FIG. 18 is a structural block diagram of a terminal 1800 according to an exemplary embodiment of this application. The terminal 1800 may be a portable mobile terminal, for example, a smartphone, a tablet computer, an MP3 player, or an MP4 player. The terminal 1800 may be further referred to as another name such as user equipment, or a portable terminal.

Generally, the terminal 1800 includes a processor 1801 and a memory 1802.

The processor 1801 may include one or more processing cores, for example, a 4-core processor or an 8-core processor. The processor 1801 may be implemented in at least one hardware form of digital signal processing (DSP), a field-programmable gate array (FPGA), and a programmable logic array (PLA). The processor 1801 may also include a main processor and a coprocessor. The main processor is a processor configured to process data in an awake state, and is also referred to as a central processing unit (CPU). The coprocessor is a low power consumption processor configured to process data in a standby state. In some embodiments, the processor 1801 may be integrated with a graphics processing unit (GPU). The GPU is configured to be responsible for rendering and drawing content that a display screen needs to display. In some embodiments, the processor 1801 may further include an artificial intelligence (AI) processor. The AI processor is configured to process a computing operation related to machine learning.

The memory 1802 may include one or more computer-readable storage media. The computer-readable storage medium may be tangible and non-transitory. The memory 1802 may further include a high-speed random access memory and a non-volatile memory, for example, one or more disk storage devices, or flash storage devices. In some embodiments, the non-transitory computer-readable storage medium in the memory 1802 is configured to store at least one instruction, and the at least one instruction is configured to be executed by the processor 1801 to implement the method for picking up a virtual item in a virtual environment provided in this application.

In some embodiments, the terminal 1800 may optionally include a peripheral device interface 1803 and at least one peripheral device. Specifically, the peripheral device can include at least one of a radio frequency circuit 1804, a touch display screen 1805, a camera component 1806, an audio circuit 1807, a positioning component 1808, and a power supply 1809. In some embodiments, the terminal 1800 further includes one or more sensors 1810. The one or more sensors 1810 include, but are not limited to: an acceleration sensor 1811, a gyroscope sensor 1812, a pressure sensor 1813, a fingerprint sensor 1814, an optical sensor 1815, and a proximity sensor 1816.

A person skilled in the art may understand that the structure shown in FIG. 18 does not constitute a limitation on the terminal 1800, and the terminal may include more or fewer components than those shown in the figure, or some components may be combined, or a different component deployment may be used.

This application further provides a non-transitory computer-readable storage medium, storing at least one instruction, at least one program, a code set, or an instruction set, the at least one instruction, the at least one program, the code set, or the instruction set being loaded and executed by a processor to implement the method for picking up a virtual item in a virtual environment according to the foregoing method embodiments.

Optionally, this application further provides a computer program product including an instruction. When run on a computer, the computer program product causes the computer to perform the method for picking up a virtual item in a virtual environment according to the foregoing aspects.

It is to be understood that "a plurality of" described in this specification refers to two or more. "And/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects.

The sequence numbers of the foregoing embodiments of this application are merely for description purpose, and do not indicate the preference among the embodiments.

A person of ordinary skill in the art may understand that all or some of the steps of the foregoing embodiments may be implemented by using hardware, or may be implemented by a program instructing relevant hardware. The program may be stored in a non-transitory computer-readable storage medium. The storage medium may be a read-only memory, a magnetic disk, an optical disc, or the like.

It should be understood that the technical features in the foregoing embodiments may be combined in various manners. For concise description, not all possible combinations of the technical features in the embodiments are described. However, as long as combinations of the technical features do not conflict with each other, the combinations of the technical features are considered as falling within the scope described in this specification.

The foregoing embodiments only show several implementations of this application and are described in detail, but they are not to be construed as a limit to the patent scope of this application. A person of ordinary skill in the art may make various changes and improvements without departing from the ideas of this application, which shall all fall within the protection scope of this application. Therefore, the protection scope of this application shall be subject to the protection scope of the appended claims.

What is claimed is:

1. A method for picking up a virtual item among a plurality of virtual items in a virtual environment, the method being performed by processing circuitry of a terminal, the method comprising:
   displaying a user interface having the virtual environment and a virtual object that is controlled by a user to move within the virtual environment;
   obtaining, based on a first instruction triggered by an interaction operation on the user interface, an operation trajectory formed by the interaction operation on the virtual environment displayed in the user interface;
   determining whether the operation trajectory forms an enclosed region;
   based on a determination that the operation trajectory forms the enclosed region,
   determining a plurality of target virtual items located in the enclosed region in the virtual environment to be picked up by the virtual object,
   determining a designated location within the enclosed region in the virtual environment,
   moving the determined target virtual items to be picked up by the virtual object closer to one another and closer to the designated location within the enclosed region in the virtual environment; and
   controlling the virtual object to pick up the target virtual items when the virtual object moves to the designated location and after the determined target virtual items to be picked up by the virtual object are moved closer to one another and closer to the designated location,
   wherein each of the picked up target virtual items is (i) added to an inventory of collected items of the virtual object or (ii) used to modify an attribute of the virtual object.

2. The method according to claim 1, wherein:
   each of the virtual items corresponds to a pickup region;
   the determining the target virtual items further comprises:
      selecting particular virtual items located in either:
         intersection regions between pickup regions and the enclosed region as candidate virtual items; or pickup regions of which central locations are in the enclosed region as the candidate virtual items; and the method further comprises determining virtual items that need to be picked up, among the candidate virtual items, as the target virtual items.

3. The method according to claim 2, wherein:

each of the virtual items has an item type; and the determining the virtual items that need to be picked up, among the candidate virtual items, as the target virtual items further comprises:

determining, when the candidate virtual items include a certain virtual item that does not need to be picked up, candidate virtual items other than the certain virtual item that does not need to be picked up, among the candidate virtual items, as the target virtual items.

4. The method according to claim 3, wherein, before the obtaining the operation trajectory formed by the interaction operation on the user interface, the method further comprises:

displaying an item setting page;

receiving an item type determining signal triggered on the item setting page; and determining an item type that does not need to be picked up based on the item type determining signal.

5. The method according to claim 2, wherein each of the virtual items corresponds to an item quantity; and the determining the virtual items that need to be picked up, among the candidate virtual items, as the target virtual items further comprises:

determining whether a certain virtual item that is identical to an item carried by the virtual object and whose item quantity exceeds a quantity threshold exists among the candidate virtual items; and determining the certain virtual item whose item quantity exceeds the quantity threshold as an excess item when the candidate virtual items includes the certain virtual item whose item quantity exceeds the quantity threshold, and determining candidate virtual items other than the excess item among the candidate virtual items as the target virtual items.

6. The method according to claim 1, wherein the moving the target virtual items includes receiving a second instruction triggered by a touch operation in a touched location in the enclosed region; and the touched location is determined as the designated location based on the second instruction.

7. The method according to claim 1, wherein the moving the target virtual items includes obtaining a central location of the enclosed region; and the central location of the enclosed region is determined as the designated location.

8. The method according to claim 1, wherein, after the controlling the virtual object to pick up the target virtual items, the method further comprises:

increasing, when the target virtual items include a restoring item, a health point of the virtual object according to a restoring value corresponding to the restoring item.

9. The method according to claim 1, wherein, after the controlling the virtual object to pick up the target virtual items, the method further comprises:

increasing, when the target virtual items include an upgrading item, an experience point of the virtual object according to an experience point corresponding to the upgrading item.

10. The method according to claim 1, wherein, after the moving the determined target virtual items, the method further comprises:

displaying the target virtual items in the designated location in a form of an aggregation icon.

11. The method according to claim 1, wherein:

each of the virtual items has an item type; and the method further comprises displaying virtual items that belong to a same item type among the target virtual items as one icon after the moving the target virtual items in the designated location in the virtual environment.

12. The method according to claim 1, wherein:

the interaction operation is a slide operation on a touch display screen of the terminal, and the operation trajectory includes a beginning region and an ending region, the beginning region being a region formed by a finger pressing-down operation in the slide operation on a display screen of the terminal, and the ending region being a region formed by a finger removing operation in the slide operation on the display screen of the terminal; and before the obtaining, the method further comprises:

determining whether the operation trajectory forms the enclosed region based on the beginning region and the ending region.

13. The method according to claim 12, wherein the determining whether the operation trajectory forms the enclosed region based on the beginning region and the ending region further comprises:

obtaining a first distance between a central location of the beginning region and a central location of the ending region; and determining that the operation trajectory forms the enclosed region when the first distance is less than a first distance threshold.

14. The method according to claim 12, wherein the determining whether the operation trajectory forms the enclosed region based on the beginning region and the ending region further comprises:

obtaining an area of an intersection between the beginning region and the ending region; and determining that the operation trajectory forms the enclosed region when an area proportion of the intersection exceeds an area proportion threshold, the area proportion being a proportion of the area of the intersection to a total area, the total area being a sum of an area of the beginning region and an area of the ending region.

15. The method according to claim 1, wherein the controlling the virtual object to pick up the target virtual items further comprises:

obtaining a distance between the virtual object and the designated location; and picking up the target virtual items automatically when the distance is less than a distance threshold.

16. A terminal, comprising processing circuitry and a memory, the memory storing at least one instruction that, when executed by the processing circuitry, causes the processing circuitry to implement:

displaying a user interface having a virtual environment and a virtual object that is controlled by a user to move within the virtual environment;

obtaining, based on a first instruction triggered by an interaction operation on the user interface, an operation trajectory formed by the interaction operation on the virtual environment displayed in the user interface;

determining whether the operation trajectory forms an enclosed region;

based on a determination that the operation trajectory forms the enclosed region, determining a plurality of target virtual items located in the enclosed region in the virtual environment to be picked up by the virtual object, determining a designated location within the enclosed region in the virtual environment, moving the determined target virtual items to be picked up by the virtual object closer to one another and closer to the designated location within the enclosed region in the virtual environment; and controlling the virtual object to pick up the target virtual items when the virtual object moves to the designated location and after the determined target virtual items to be picked up by the virtual object are moved closer to one another and closer to the designated location, wherein each of the picked up target virtual items is (i) added to an inventory of collected items of the virtual object or (ii) used to modify an attribute of the virtual object.

17. The terminal according to claim 16, wherein the processing circuitry further implements:

selecting first virtual items located in intersection regions between pickup regions and the enclosed region as candidate virtual items, or selecting second virtual items located in pickup regions of which central locations are in the enclosed region as the candidate virtual items; and determining virtual items that need to be picked up among the candidate virtual items, as the target virtual items.

18. A non-transitory computer-readable storage medium, storing at least one instruction that, when executed by processing circuitry, causes the processing circuitry to implement:

displaying a user interface having a virtual environment and a virtual object that is controlled by a user to move within the virtual environment;

obtaining, based on a first instruction triggered by an interaction operation on the user interface, an operation trajectory formed by the interaction operation on the virtual environment displayed in the user interface;

determining whether the operation trajectory forms an enclosed region;

based on a determination that the operation trajectory forms the enclosed region, determining a plurality of target virtual items located in the enclosed region in the virtual environment to be picked up by the virtual object, determining a designated location within the enclosed region in the virtual environment, moving the determined target virtual items to be picked up by the virtual object closer to one another and closer to the designated location within the enclosed region in the virtual environment; and controlling the virtual object to pick up the target virtual items when the virtual object moves to the designated location and after the determined target virtual items to be picked up by the virtual object are moved closer to one another and closer to the designated location, wherein each of the picked up target virtual items is (i) added to an inventory of collected items of the virtual object or (ii) used to modify an attribute of the virtual object.

19. The non-transitory computer-readable storage medium according to claim 18, wherein the at least one instruction further causes the processing circuitry to implement:

selecting first virtual items located in intersection regions between pickup regions and the enclosed region as candidate virtual items, or selecting second virtual items located in pickup regions of which central locations are in the enclosed region as the candidate virtual items; and determining virtual items that need to be picked up, among the candidate virtual items, as the target virtual items.

* * * * *